US008751723B2

(12) United States Patent
Takizawa

(10) Patent No.: US 8,751,723 B2
(45) Date of Patent: Jun. 10, 2014

(54) MEMORY ACCESS CONTROL DEVICE, METHOD AND RECORDING MEDIUM FOR SIMULTANEOUSLY ACCESSING HORIZONTALLY OR VERTICALLY CONSECUTIVE UNIT DATA OR UNIT DATA ON VERTICALLY ALTERNATE LINES IN DIFFERENT MODES

(75) Inventor: Tetsuro Takizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 766 days.

(21) Appl. No.: 12/224,939

(22) PCT Filed: Jul. 18, 2007

(86) PCT No.: PCT/JP2007/064535
§ 371 (c)(1),
(2), (4) Date: Nov. 7, 2008

(87) PCT Pub. No.: WO2008/010599
PCT Pub. Date: Jan. 24, 2008

(65) Prior Publication Data
US 2010/0030993 A1 Feb. 4, 2010

(30) Foreign Application Priority Data

Jul. 20, 2006 (JP) ................. 2006-197646

(51) Int. Cl.
G06F 12/00 (2006.01)
G06F 13/00 (2006.01)
(52) U.S. Cl.
USPC ................ 711/5; 711/168; 345/533; 345/564

(58) Field of Classification Search
USPC .............. 711/5, 167, 168; 345/533, 536, 564, 345/571
See application file for complete search history.

(56) References Cited

U.S. PATENT DOCUMENTS

| 5,794,017 A * | 8/1998 | Evans et al. ................... 345/544 |
| 5,845,313 A | 12/1998 | Estakhri et al. |
| 5,867,726 A | 2/1999 | Ohsuga et al. |
| 5,982,395 A * | 11/1999 | Olson et al. ................... 345/572 |
| 6,081,878 A | 6/2000 | Estakhri et al. |
| 6,172,906 B1 | 1/2001 | Estakhri et al. |

(Continued)

FOREIGN PATENT DOCUMENTS

EP 0828238 (A2) 3/1998
JP 10-210251 8/1998

(Continued)

Primary Examiner — Arpan P. Savla
Assistant Examiner — Glenn Gossage
(74) Attorney, Agent, or Firm — Foley & Lardner LLP

(57) ABSTRACT

An access control device, which increases memory access efficiency to data stored in a memory, includes a plurality of groups of the memory, and divides and stores the data in different memory areas of the plurality of groups of the memory, distinguished based on predetermined bits of an access address. The access control device accesses the data stored in the different memory areas simultaneously in the same clock cycle of access to the memory. The predetermined bits of the access address are controlled independently for each of the groups of the memory. The part of the access address other than the predetermined bits controlled independently for each of the groups is common for the plurality of groups. Modes can be selected to access two horizontally or vertically consecutive unit data or data on vertically alternate lines at a time. The data may be image data or pixel data.

45 Claims, 23 Drawing Sheets

(56) References Cited

U.S. PATENT DOCUMENTS

| | | |
|---|---|---|
| 6,202,138 B1 | 3/2001 | Estakhri et al. |
| 6,397,314 B1 | 5/2002 | Estakhri et al. |
| 6,405,302 B1 | 6/2002 | Ohsuga et al. |
| 6,434,690 B1 | 8/2002 | Ohsuga et al. |
| 6,728,851 B1 | 4/2004 | Estakhri et al. |
| 6,757,800 B1 | 6/2004 | Estakhri et al. |
| 6,819,323 B2 | 11/2004 | Sunaga |
| 6,941,443 B2 | 9/2005 | Isomura et al. |
| 7,069,423 B2 | 6/2006 | Ohsuga et al. |
| 7,085,172 B2 | 8/2006 | Kondo et al. |
| 7,111,140 B2 | 9/2006 | Estakhri et al. |
| 7,363,466 B2 | 4/2008 | Ohsuga et al. |
| 7,852,343 B2 * | 12/2010 | Tanaka et al. ............... 345/531 |
| 2004/0100472 A1 | 5/2004 | Linzer et al. |
| 2006/0195651 A1 | 8/2006 | Estakhri et al. |
| 2007/0266201 A1 | 11/2007 | Estakhri et al. |

FOREIGN PATENT DOCUMENTS

| | | |
|---|---|---|
| JP | 2001-243771 A | 9/2001 |
| JP | 2002-222117 A | 8/2002 |
| JP | 2005-222530 A | 8/2005 |
| JP | 2006-134347 A | 5/2006 |
| JP | 2006-139805 A | 6/2006 |

* cited by examiner

|  | IMAGE DATA | | | | | | | | |
|---|---|---|---|---|---|---|---|---|---|
| 201 | (1023, 0) | (1023, 1) | (1023, 2) | (1023, 3) | (1023, 4) | (1023, 5) | (1023, 6) | (1023, 7) | ..... (1023, 1023) |
| ⋮ | ⋮ | ⋮ | ⋮ | ⋮ | ⋮ | ⋮ | ⋮ | ⋮ | ⋮ |
| | (2, 0) | (2, 1) | (2, 2) | (2, 3) | (2, 4) | (2, 5) | (2, 6) | (2, 7) | ..... (2, 1023) |
| | (1, 0) | (1, 1) | (1, 2) | (1, 3) | (1, 4) | (1, 5) | (1, 6) | (1, 7) | ..... (1, 1023) |
| | (0, 0) | (0, 1) | (0, 2) | (0, 3) | (0, 4) | (0, 5) | (0, 6) | (0, 7) | ..... (0, 1023) |

161  IMAGE DATA LOCATION INFORMATION

| (0, 0)<br>MEMORY A ADDRESS 0 | (1, 0)<br>MEMORY B ADDRESS 0 | (2, 0)<br>MEMORY A ADDRESS 4 |
| --- | --- | --- |
| (0, 1)<br>MEMORY B ADDRESS 1 | (1, 1)<br>MEMORY A ADDRESS 1 | (2, 1)<br>MEMORY B ADDRESS 5 |
| (0, 2)<br>MEMORY B ADDRESS 2 | (1, 2)<br>MEMORY A ADDRESS 2 | (2, 2)<br>MEMORY B ADDRESS 6 |
| (0, 3)<br>MEMORY A ADDRESS 3 | (1, 3)<br>MEMORY B ADDRESS 3 | (2, 3)<br>MEMORY A ADDRESS 7 |
| (0, 4)<br>MEMORY A ADDRESS 2048 | (1, 4)<br>MEMORY B ADDRESS 2048 | (2, 4)<br>MEMORY A ADDRESS 2052 |
| (0, 5)<br>MEMORY B ADDRESS 2049 | (1, 5)<br>MEMORY AADDRESS 2049 | (2, 5)<br>MEMORY B ADDRESS 2053 |
| (0, 6)<br>MEMORY B ADDRESS 2050 | (1, 6)<br>MEMORY A ADDRESS 2050 | (2, 6)<br>MEMORY B ADDRESS 2054 |
| (0, 7)<br>MEMORY A ADDRESS 2051 | (1, 7)<br>MEMORY B ADDRESS 2051 | (2, 7)<br>MEMORY A ADDRESS 2055 |

| (0, 1023)<br>MEMORY A ADDRESS 522243 | (1, 1023)<br>MEMORY B ADDRESS 522243 | (2, 1023)<br>MEMORY A ADDRESS 522247 |

...

| (1023, 0)<br>MEMORY B ADDRESS 2044 |
| --- |
| (1023, 1)<br>MEMORY A ADDRESS 2045 |
| (1023, 2)<br>MEMORY A ADDRESS 2046 |
| (1023, 3)<br>MEMORY B ADDRESS 2047 |
| (1023, 4)<br>MEMORY A ADDRESS 4092 |
| (1023, 5)<br>MEMORY A ADDRESS 4093 |
| (1023, 6)<br>MEMORY A ADDRESS 4094 |
| (1023, 7)<br>MEMORY B ADDRESS 4095 |

| (1023, 1023)<br>MEMORY B ADDRESS 524287 |

FIG. 6

601 INFORMATION IN ONE BLOCK

| (0, 0) MEMORY A ADDRESS 0 | (1, 0) MEMORY B ADDRESS 0 |
|---|---|
| (0, 1) MEMORY B ADDRESS 1 | (1, 1) MEMORY A ADDRESS 1 |
| (0, 2) MEMORY B ADDRESS 2 | (1, 2) MEMORY A ADDRESS 2 |
| (0, 3) MEMORY A ADDRESS 3 | (1, 3) MEMORY B ADDRESS 3 |

FIG. 7

151a DISCRETE ADDRESS CORRESPONDENCE INFORMATION

ADA=ADB

151b DISCRETE ADDRESS CORRESPONDENCE INFORMATION

| ADA=0 ADB=1 CORRESPOND TO EACH OTHER | ADA=1 ADB=0 CORRESPOND TO EACH OTHER | ADA=2 ADB=3 CORRESPOND TO EACH OTHER | ADA=3 ADB=2 CORRESPOND TO EACH OTHER |
|---|---|---|---|

151c DISCRETE ADDRESS CORRESPONDENCE INFORMATION

| ADA=0 ADB=2 CORRESPOND TO EACH OTHER | ADA=1 ADB=3 CORRESPOND TO EACH OTHER | ADA=2 ADB=0 CORRESPOND TO EACH OTHER | ADA=3 ADB=1 CORRESPOND TO EACH OTHER |
|---|---|---|---|

FIG. 8

151d DISCRETE ADDRESS CORRESPONDENCE INFORMATION

ADA=ADB=(h-1)

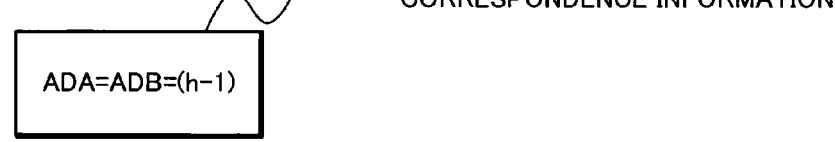

151e DISCRETE ADDRESS CORRESPONDENCE INFORMATION

| ADA=(4i-4) ADB=ADA+1 =(4i-3) CORRESPOND TO EACH OTHER | ADA=(4i-1) ADB=ADA-1 =(4i-2) CORRESPOND TO EACH OTHER | ADA=(4i-3) ADB=ADA-1 =(4i-4) CORRESPOND TO EACH OTHER | ADA=(4i-2) ADB=ADA+1 =(4i-1) CORRESPOND TO EACH OTHER |
|---|---|---|---|

151f DISCRETE ADDRESS CORRESPONDENCE INFORMATION

| ADA=(4i-4) ADB=ADA+2 =(4i-2) CORRESPOND TO EACH OTHER | ADA=(4i-1) ADB=ADA-2 =(4i-3) CORRESPOND TO EACH OTHER | ADA=(4i-2) ADB=ADA-2 =(4i-4) CORRESPOND TO EACH OTHER | ADA=(4i-3) ADB=ADA+2 =(4i-1) CORRESPOND TO EACH OTHER |
|---|---|---|---|

FIG. 11

161 IMAGE DATA LOCATION INFORMATION

| (0, 0) MEMORY A ADDRESS 0 | (1, 0) MEMORY B ADDRESS 0 | (2, 0) MEMORY B ADDRESS 0 | (3, 0) MEMORY A ADDRESS 4 | (4, 0) MEMORY A ADDRESS 4 | (5, 0) MEMORY A ADDRESS 4 |
|---|---|---|---|---|---|
| (0, 1) MEMORY B ADDRESS 1 | (1, 1) MEMORY A ADDRESS 1 | (2, 1) MEMORY A ADDRESS 1 | (3, 1) MEMORY B ADDRESS 5 | (4, 1) MEMORY B ADDRESS 5 | (5, 1) MEMORY B ADDRESS 5 |
| (0, 2) MEMORY A ADDRESS 2 | (1, 2) MEMORY B ADDRESS 2 | (2, 2) MEMORY B ADDRESS 2 | (3, 2) MEMORY A ADDRESS 6 | (4, 2) MEMORY A ADDRESS 6 | (5, 2) MEMORY A ADDRESS 6 |
| (0, 3) MEMORY B ADDRESS 3 | (1, 3) MEMORY A ADDRESS 3 | (2, 3) MEMORY A ADDRESS 3 | (3, 3) MEMORY B ADDRESS 7 | (4, 3) MEMORY B ADDRESS 7 | (5, 3) MEMORY B ADDRESS 7 |
| (0, 4) MEMORY A ADDRESS 1024 | (1, 4) MEMORY B ADDRESS 1024 | (2, 4) MEMORY B ADDRESS 1024 | (3, 4) MEMORY A ADDRESS 1028 | (4, 4) MEMORY A ADDRESS 1028 | (5, 4) MEMORY A ADDRESS 1028 |
| (0, 5) MEMORY B ADDRESS 1025 | (1, 5) MEMORY A ADDRESS 1025 | (2, 5) MEMORY A ADDRESS 1025 | (3, 5) MEMORY B ADDRESS 1029 | (4, 5) MEMORY B ADDRESS 1029 | (5, 5) MEMORY B ADDRESS 1029 |
| (0, 6) MEMORY A ADDRESS 1026 | (1, 6) MEMORY B ADDRESS 1026 | (2, 6) MEMORY B ADDRESS 1026 | (3, 6) MEMORY A ADDRESS 1030 | (4, 6) MEMORY A ADDRESS 1030 | (5, 6) MEMORY A ADDRESS 1030 |
| (0, 7) MEMORY B ADDRESS 1027 | (1, 7) MEMORY A ADDRESS 1027 | (2, 7) MEMORY A ADDRESS 1027 | (3, 7) MEMORY B ADDRESS 1031 | (4, 7) MEMORY B ADDRESS 1031 | (5, 7) MEMORY B ADDRESS 1031 |

| (0, 1023) MEMORY A ADDRESS 261123 | (1, 1023) MEMORY B ADDRESS 261123 | (2, 1023) MEMORY B ADDRESS 261123 | (3, 1023) MEMORY A ADDRESS 261127 | (4, 1023) MEMORY A ADDRESS 261127 | (5, 1023) MEMORY A ADDRESS 261127 |

| (1022, 0) (1023, 0) MEMORY B ADDRESS 1020 |
|---|
| (1022, 1) (1023, 1) MEMORY A ADDRESS 1021 |
| (1022, 2) (1023, 2) MEMORY B ADDRESS 1022 |
| (1022, 3) (1023, 3) MEMORY A ADDRESS 1023 |
| (1022, 4) (1023, 4) MEMORY B ADDRESS 2044 |
| (1022, 5) (1023, 5) MEMORY A ADDRESS 2045 |
| (1022, 6) (1023, 6) MEMORY B ADDRESS 2046 |
| (1022, 7) (1023, 7) MEMORY A ADDRESS 2047 |

| (1022, 1023) (1023, 1023) MEMORY B ADDRESS 262143 |
|---|

FIG. 14

| | |
|---|---|
| 1401 | INFORMATION IN ONE BLOCK |

| (0, 0) (1, 0)<br>MEMORY A ADDRESS 0 | (2, 0) (3, 0)<br>MEMORY B ADDRESS 0 |
|---|---|
| (0, 1) (1, 1)<br>MEMORY B ADDRESS 1 | (2, 1) (3, 1)<br>MEMORY A ADDRESS 1 |
| (0, 2) (1, 2)<br>MEMORY B ADDRESS 2 | (2, 2) (3, 2)<br>MEMORY A ADDRESS 2 |
| (0, 3) (1, 3)<br>MEMORY A ADDRESS 3 | (2, 3) (3, 3)<br>MEMORY B ADDRESS 3 |

FIG. 15

151g — DISCRETE ADDRESS CORRESPONDENCE INFORMATION

| ADA=ADB=(k-1) |
|---|

151h — DISCRETE ADDRESS CORRESPONDENCE INFORMATION

| ADA=(4l-4)<br>ADB=ADA+1<br>=(4l-3)<br>CORRESPOND TO<br>EACH OTHER | ADA=(4l-1)<br>ADB=ADA-1<br>=(4l-2)<br>CORRESPOND TO<br>EACH OTHER | ADA=(4l-3)<br>ADB=ADA-1<br>=(4l-4)<br>CORRESPOND TO<br>EACH OTHER | ADA=(4l-2)<br>ADB=ADA+1<br>=(4l-1)<br>CORRESPOND TO<br>EACH OTHER |
|---|---|---|---|

151i — DISCRETE ADDRESS CORRESPONDENCE INFORMATION

| ADA=(4l-4)<br>ADB=ADA+2<br>=(4l-2)<br>CORRESPOND TO<br>EACH OTHER | ADA=(4l-1)<br>ADB=ADA-2<br>=(4l-3)<br>CORRESPOND TO<br>EACH OTHER | ADA=(4l-2)<br>ADB=ADA-2<br>=(4l-4)<br>CORRESPOND TO<br>EACH OTHER | ADA=(4l-3)<br>ADB=ADA+2<br>=(4l-1)<br>CORRESPOND TO<br>EACH OTHER |
|---|---|---|---|

FIG. 16

161 IMAGE DATA LOCATION INFORMATION

| (0, 0)<br>MEMORY A ADDRESS 0 | (1, 0)<br>MEMORY B ADDRESS 0 | (2, 0)<br>MEMORY A ADDRESS 2 | ... | (1023, 0)<br>MEMORY B ADDRESS 1022 |
|---|---|---|---|---|
| (0, 1)<br>MEMORY B ADDRESS 1 | (1, 1)<br>MEMORY A ADDRESS 1 | (2, 1)<br>MEMORY B ADDRESS 3 | ... | (1023, 1)<br>MEMORY A ADDRESS 1023 |
| (0, 2)<br>MEMORY A ADDRESS 1024 | (1, 2)<br>MEMORY B ADDRESS 1024 | (2, 2)<br>MEMORY A ADDRESS 1026 | ... | (1023, 2)<br>MEMORY B ADDRESS 2046 |
| (0, 3)<br>MEMORY B ADDRESS 1025 | (1, 3)<br>MEMORY A ADDRESS 1025 | (2, 3)<br>MEMORY B ADDRESS 1027 | ... | (1023, 3)<br>MEMORY A ADDRESS 2047 |
| (0, 4)<br>MEMORY A ADDRESS 2048 | (1, 4)<br>MEMORY B ADDRESS 2048 | (2, 4)<br>MEMORY A ADDRESS 2050 | ... | (1023, 4)<br>MEMORY B ADDRESS 3070 |
| (0, 5)<br>MEMORY B ADDRESS 2049 | (1, 5)<br>MEMORY A ADDRESS 2049 | (2, 5)<br>MEMORY B ADDRESS 2051 | ... | (1023, 5)<br>MEMORY A ADDRESS 3071 |
| (0, 6)<br>MEMORY A ADDRESS 3072 | (1, 6)<br>MEMORY B ADDRESS 3072 | (2, 6)<br>MEMORY A ADDRESS 3074 | ... | (1023, 6)<br>MEMORY B ADDRESS 4094 |
| (0, 7)<br>MEMORY B ADDRESS 3073 | (1, 7)<br>MEMORY A ADDRESS 3073 | (2, 7)<br>MEMORY B ADDRESS 3075 | ... | (1023, 7)<br>MEMORY A ADDRESS 4095 |
| ⋮ | ⋮ | ⋮ | ... | ⋮ |
| (0, 1023)<br>MEMORY B ADDRESS 2095105 | (1, 1023)<br>MEMORY A ADDRESS 2095105 | (2, 1023)<br>MEMORY B ADDRESS 2095107 | ... | (1023, 1023)<br>MEMORY A ADDRESS 2097149 |

FIG. 18

131 ARRANGED IMAGE DATA

| (1, 0) MEMORY B ADDRESS 0 | (0, 1) MEMORY B ADDRESS 1 | (3, 0) MEMORY B ADDRESS 2 | (2, 1) MEMORY B ADDRESS 3 |

...

| (1022, 1023) MEMORY B ADDRESS 2097149 |

FIG. 19

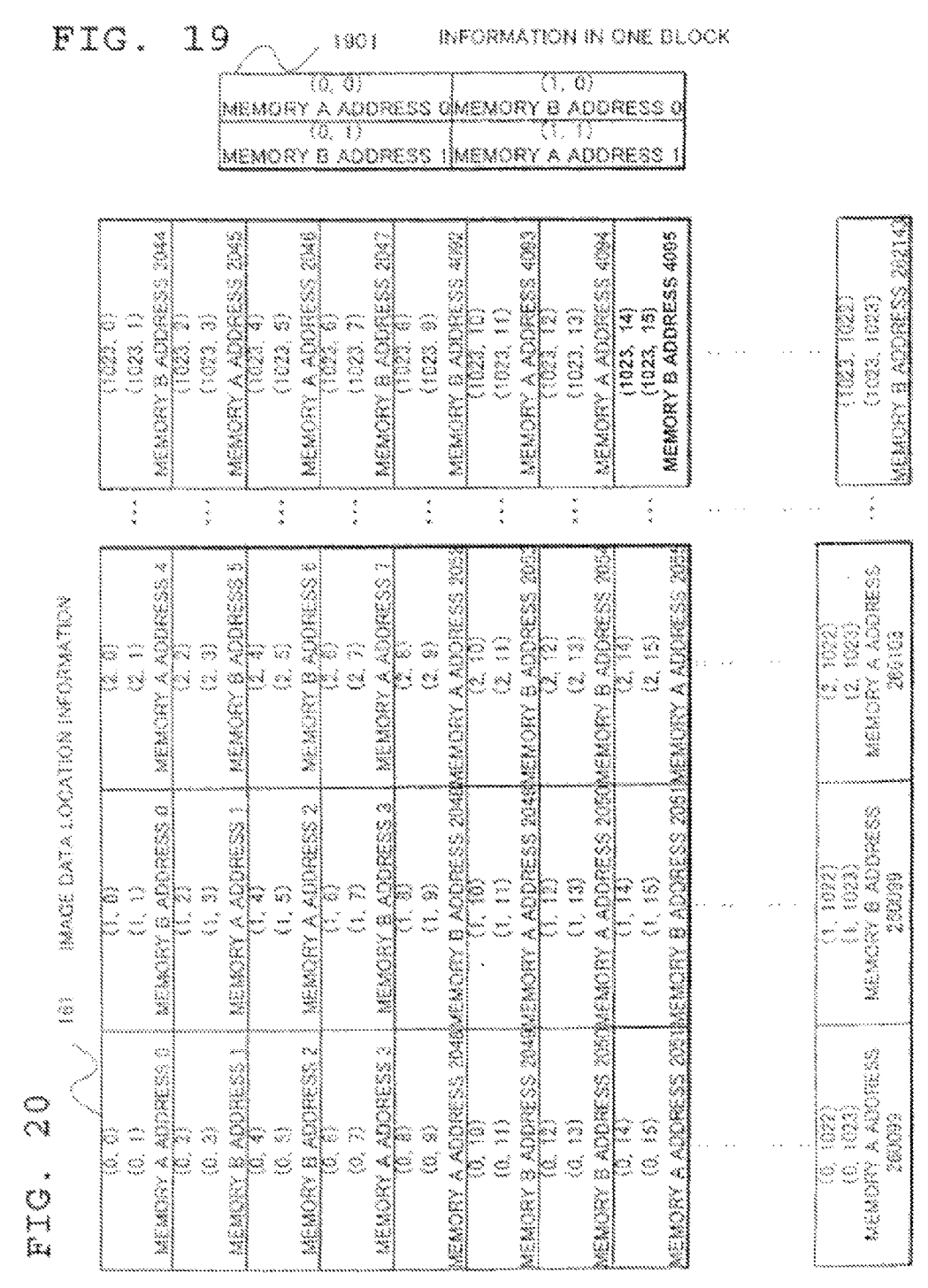

*Figure 19 shows information in one block (1901), with a 2x2 grid containing (0,0) MEMORY A ADDRESS 0, (1,0) MEMORY B ADDRESS 0, (0,1) MEMORY B ADDRESS 1, (1,1) MEMORY A ADDRESS 1.*

FIG. 20

*Figure 20 shows image data location information (101).*

FIG. 24

161 IMAGE DATA LOCATION INFORMATION

| (0, 0) (1, 0)<br>(0, 1) (1, 1)<br>MEMORY A ADDRESS 0 | (2, 0) (3, 0)<br>(2, 1) (3, 1)<br>MEMORY B ADDRESS 0 | (4, 0) (5, 0)<br>(4, 1) (5, 1)<br>MEMORY A ADDRESS 4 | | (1022, 0) (1023, 0)<br>(1022, 1) (1023, 1)<br>MEMORY B ADDRESS 1020 |
| --- | --- | --- | --- | --- |
| (0, 2) (1, 2)<br>(0, 3) (1, 3)<br>MEMORY B ADDRESS 1 | (2, 2) (3, 2)<br>(2, 3) (3, 3)<br>MEMORY A ADDRESS 1 | (4, 2) (5, 2)<br>(4, 3) (5, 3)<br>MEMORY B ADDRESS 5 | | (1022, 2) (1023, 2)<br>(1022, 3) (1023, 3)<br>MEMORY A ADDRESS 1021 |
| (0, 4) (1, 4)<br>(0, 5) (1, 5)<br>MEMORY A ADDRESS 2 | (2, 4) (3, 4)<br>(2, 5) (3, 5)<br>MEMORY B ADDRESS 2 | (4, 4) (5, 4)<br>(4, 5) (5, 5)<br>MEMORY A ADDRESS 6 | | (1022, 4) (1023, 4)<br>(1022, 5) (1023, 5)<br>MEMORY B ADDRESS 1022 |
| (0, 6) (1, 6)<br>(0, 7) (1, 7)<br>MEMORY B ADDRESS 3 | (2, 6) (3, 6)<br>(2, 7) (3, 7)<br>MEMORY A ADDRESS 3 | (4, 6) (5, 6)<br>(4, 7) (5, 7)<br>MEMORY B ADDRESS 7 | | (1022, 6) (1023, 6)<br>(1022, 7) (1023, 7)<br>MEMORY A ADDRESS 1023 |
| (0, 8) (1, 8)<br>(0, 9) (1, 9)<br>MEMORY A ADDRESS 1024 | (2, 8) (3, 8)<br>(2, 9) (3, 9)<br>MEMORY B ADDRESS 1024 | (4, 8) (5, 8)<br>(4, 9) (5, 9)<br>MEMORY A ADDRESS 1028 | | (1022, 8) (1023, 8)<br>(1022, 9) (1023, 9)<br>MEMORY B ADDRESS 2044 |
| (0, 10) (1, 10)<br>(0, 11) (1, 11)<br>MEMORY B ADDRESS 1025 | (2, 10) (3, 10)<br>(2, 11) (3, 11)<br>MEMORY A ADDRESS 1025 | (4, 10) (5, 10)<br>(4, 11) (5, 11)<br>MEMORY B ADDRESS 1029 | | (1022, 10) (1023, 10)<br>(1022, 11) (1023, 11)<br>MEMORY A ADDRESS 2045 |
| (0, 12) (1, 12)<br>(0, 13) (1, 13)<br>MEMORY A ADDRESS 1026 | (2, 12) (3, 12)<br>(2, 13) (3, 13)<br>MEMORY B ADDRESS 1026 | (4, 12) (5, 12)<br>(4, 13) (5, 13)<br>MEMORY A ADDRESS 1030 | | (1022, 12) (1023, 12)<br>(1022, 13) (1023, 13)<br>MEMORY B ADDRESS 2046 |
| (0, 14) (1, 14)<br>(0, 15) (1, 15)<br>MEMORY B ADDRESS 1027 | (2, 14) (3, 14)<br>(2, 15) (3, 15)<br>MEMORY A ADDRESS 1027 | (4, 14) (5, 14)<br>(4, 15) (5, 15)<br>MEMORY B ADDRESS 1031 | | (1022, 14) (1023, 14)<br>(1022, 15) (1023, 15)<br>MEMORY A ADDRESS 2047 |
| ⋮ | ⋮ | ⋮ | ⋮ | ⋮ |
| (0, 1022) (1, 1022)<br>(0, 1023) (1, 1023)<br>MEMORY A ADDRESS 130051 | (2, 1022) (3, 1022)<br>(2, 1023) (3, 1023)<br>MEMORY B ADDRESS 130051 | (4, 1022) (5, 1022)<br>(4, 1023) (5, 1023)<br>MEMORY A ADDRESS 130055 | | (1022, 1022) (1023, 1022)<br>(1022, 1023) (1023, 1023)<br>MEMORY B ADDRESS 131071 |

FIG. 25

121 ARRANGED IMAGE DATA

| (0, 0)(1, 0) (0, 1)(1, 1) MEMORY A ADDRESS 0 | (2, 2)(3, 2) (2, 3)(3, 3) MEMORY A ADDRESS 1 | (2, 4)(3, 4) (2, 5)(3, 5) MEMORY A ADDRESS 2 | (0, 6)(1, 6) (0, 7)(1, 7) MEMORY A ADDRESS 3 |

...

(1020, 1022)(1021, 1022)
(1020, 1023)(1021, 1023)
MEMORY A ADDRESS 131071

FIG. 27

INFORMATION IN ONE BLOCK

2701

| (0, 0) (1, 0)<br>(0, 1) (1, 1)<br>MEMORY A ADDRESS 0 | (2, 0) (3, 0)<br>(2, 1) (3, 1)<br>MEMORY B ADDRESS 0 |
|---|---|
| (0, 2) (1, 2)<br>(0, 3) (1, 3)<br>MEMORY B ADDRESS 1 | (2, 2) (3, 2)<br>(2, 3) (3, 3)<br>MEMORY A ADDRESS 1 |
| (0, 4) (1, 4)<br>(0, 5) (1, 5)<br>MEMORY B ADDRESS 2 | (2, 4) (3, 4)<br>(2, 5) (3, 5)<br>MEMORY A ADDRESS 2 |
| (0, 6) (1, 6)<br>(0, 7) (1, 7)<br>MEMORY A ADDRESS 3 | (2, 6) (3, 6)<br>(2, 7) (3, 7)<br>MEMORY B ADDRESS 3 |

US 8,751,723 B2

MEMORY ACCESS CONTROL DEVICE, METHOD AND RECORDING MEDIUM FOR SIMULTANEOUSLY ACCESSING HORIZONTALLY OR VERTICALLY CONSECUTIVE UNIT DATA OR UNIT DATA ON VERTICALLY ALTERNATE LINES IN DIFFERENT MODES

INCORPORATION BY REFERENCE

This application claims priority on the basis of Japanese Patent Application No. 2006-197646 filed as of Jul. 20, 2006, and incorporates its entire disclosure herein by reference.

TECHNICAL FIELD

The present invention relates to a memory access control device, a memory access control method, a data storage method and a memory access control program which can increase access efficiency when accessing data stored in a memory.

BACKGROUND ART

If a broader access bandwidth to a memory is desired, there are two methods to achieve this. The first is to increase the clock frequency for accessing the memory. The second is to expand the bus width in order to increase the amount of data that can be accessed at a time. A clock frequency cannot be increased to exceed the maximum frequency supported by a memory. Therefore, an access bandwidth has generally been broadened by first increasing the memory frequency to the limit, and thereafter by expanding the bus width to increase the amount of data accessed at a time.

One example of related art of such a memory access method is the one disclosed in Patent Literature 1 (Japanese Patent Laying-Open No. 1998-210251). The art of Patent Literature 1 divides an entire image into blocks, and forms each block with data of burst-accessible memory addresses. Within one block, any data arrays, whether lateral, longitudinal or otherwise, can be burst accessed, thereby enabling fast access to an image memory regardless of the direction of accesses.

Patent Literature 1: Japanese Patent Laying-Open No. 1998-210251

However, memory access methods according to related arts, including the one disclosed in Patent Literature 1, have a problem in that access efficiency is decreased. This is because when the bus width is increased, the amount of data assigned to one address also increases, causing data other than the desired one to be unnecessarily accessed at the same time.

For example, when two-dimensional image data are accessed, the data can be accessed in two directions: lateral (horizontal) and longitudinal (vertical). If an address stores laterally consecutive data, but if the user wants to access longitudinally consecutive data, such access could be extremely inefficient because many data pieces are unnecessarily accessed. Similarly, when accessing an address storing data that are longitudinally consecutive, on the contrary, if the user wants to access laterally consecutive data, access efficiency tends to be very low because a lot of unnecessary data are accessed.

(Object)

The object of the present invention is to increase memory access efficiency when accessing data stored in a memory.

SUMMARY

According to a first exemplary aspect of the invention, a memory access control device which controls access to a memory that stores data, including
 a plurality of groups of the memory, wherein
 the data are divided and stored in different memory areas of the plurality of groups of the memory distinguished based on the predetermined bits of an access address to the plurality of groups of the memory, and
 the data stored in the different memory areas of the plurality of groups of the memory are accessed simultaneously in the same clock cycle of access to the memory.

According to a second exemplary aspect of the invention, a memory access control method of controlling access to a memory that stores data, comprising
 a storage procedure of dividing and storing the data in different memory areas distinguished based on the predetermined bits of an access address to the plurality of groups of the memory, and
 an access procedure of accessing the data stored in the different memory areas of the plurality groups of the memory simultaneously in the same clock cycle of access to the memory.

According to a third exemplary aspect of the invention, a data storage method in a memory access control device which controls access to a memory that stores data, comprising
 a storage procedure of dividing and storing the data in the different memory areas distinguished based on the predetermined bits of an access address to the plurality of groups of the memory.

According to a fourth exemplary aspect of the invention, a computer-readable recording medium for storing a memory access control program to be executed on a computer device to control access to a memory that stores data, wherein the memory access control program causing the computer device to execute
 a storage function which divides and stores the data in the different memory areas distinguished by the predetermined bits of an access address to the plurality of groups of the memory, and
 an access function which accesses the data stored in the different memory areas of the plurality groups of the memory simultaneously in the same clock cycle of access to the memory.

According to the present invention, memory access efficiency can be increased when accessing data stored in a memory.

This is because, data are divided and stored in different memory areas, distinguished based on predetermined bits of an access address, of a plurality of groups of a memory, and data stored in the different memory areas of the plurality of groups of the memory are accessed simultaneously in the same clock cycle of access to the memory. By this, the number of accesses to data other than the target data is significantly decreased.

BRIEF DESCRIPTION OF THE DRAWINGS

FIG. 2 is a diagram which illustrates image data 201 according to the first exemplary embodiment;

FIG. 3 is a diagram which illustrates image data location information 161 according to the first exemplary embodiment;

FIG. 6 is a diagram which illustrates one block's worth of image data location information 161 according to the first exemplary embodiment;

FIG. 7 is a diagram which shows discrete address correspondence information 151a, 151b and 151c stored in a discrete address correspondence information storage unit 15 according to the first exemplary embodiment;

FIG. 8 is a diagram which shows discrete address correspondence information 151d, 151e and 151f stored in a discrete address correspondence information storage unit 15 according to the first exemplary embodiment;

FIG. 11 is a diagram which illustrates image data location information 161 according to a second exemplary embodiment of the present invention;

FIG. 14 is a diagram which illustrates one block's worth of image data location information 161 according to the second exemplary embodiment;

FIG. 15 is a diagram which shows discrete address correspondence information stored in a discrete address correspondence information storage unit 15 according to the second exemplary embodiment;

FIG. 16 is a diagram which illustrates image data location information 161 according to a third exemplary embodiment of the invention;

FIG. 18 is a diagram which illustrates example data stored in a memory 13 according to the third exemplary embodiment;

FIG. 19 is a diagram which illustrates one block's worth of image data location information 161 according to the third exemplary embodiment;

FIG. 20 is a diagram which illustrates image data location information 161 according to a fourth exemplary embodiment of the present invention;

FIG. 24 is a diagram which illustrates image data location information 161 according to a fifth exemplary embodiment of the present invention;

FIG. 25 is a diagram which illustrates example data stored in a memory 12 according to the fifth exemplary embodiment;

FIG. 27 is a diagram which illustrates one block's worth of image data location information 161 according to the fifth exemplary embodiment.

EXEMPLARY EMBODIMENT (First Exemplary Embodiment)

A first exemplary embodiment of the invention will now be described in detail with reference to the drawings.

(Configuration of First Exemplary Embodiment)

Figure 1:
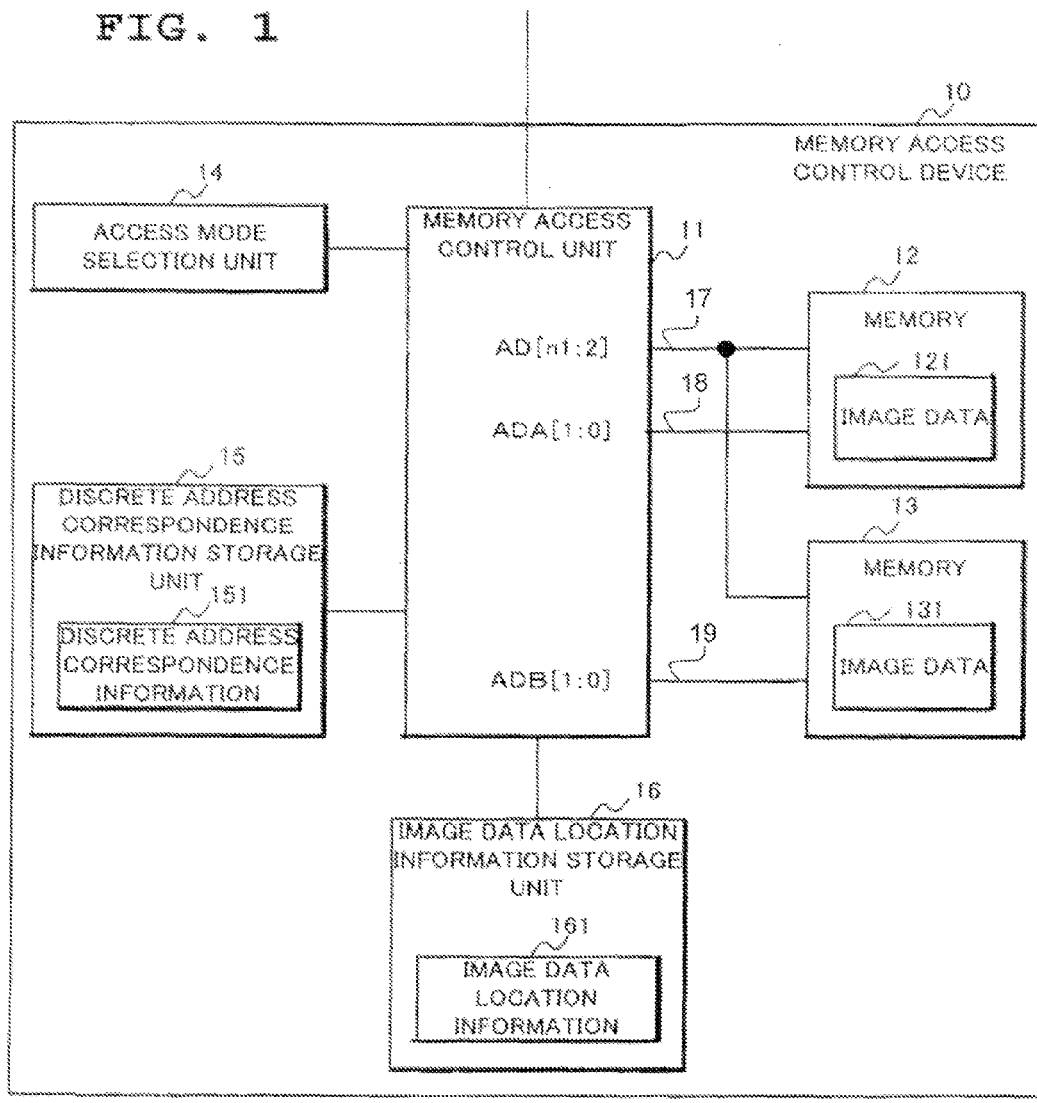
FIG. 1 is a block diagram which shows the configuration of a memory access control device 10 according to a first exemplary embodiment of the present invention.

FIG. 1 is a block diagram which shows the configuration of a memory access control device 10 according to a first exemplary embodiment of the present invention.

The memory access control device 10 comprises a memory access control unit 11, memories 12, 13, an access mode selection unit 14, a discrete address correspondence information storage unit 15 and an image data location information storage unit 16, wherein the memory 12 and the memory 13 are connected with the memory access control unit 11 via address signals 17 to 19.

The memory access control unit 11 has a function to access coded image data stored in different areas of the memories 12, 13 in the same clock cycle, using the access mode selected by the access mode selection unit 14 and based on the discrete address correspondence information 151 stored in the discrete address correspondence information storage unit 15 and the image data location information 161 stored in the image data location information storage unit 16.

The image data location information storage unit 16 has a function to store image data location information 161, which indicates how image data are arranged in the memories 12, 13.

The image data location information 161 indicates location information for the pixel stored in each address in the memories 12, 13, based on the memory capacity of each of the memories 12, 13, the bus width per memory for the memories 12, 13, the number of bits per pixel for the pixels which form the image data and the location information for the pixels which form the image data and so on.

FIG. 3 is a diagram which illustrates the image data location information 161 generated based on the image data 201 shown in FIG. 2, the memory capacities of the memories 12, 13, the bus width per memory and so on.

Suppose here that the bus width per memory for the memories 12, 13 is 8 bits and that each pixel in the image data stored in these memories has 8 bits. Then one pixel can be stored per address in each of these memories.

Therefore, the memories 12, 13 together store the image data 201 with 1024 pixels by 1024 lines in FIG. 2, in the arrangement as shown in FIG. 3.

In FIG. 3, the coordinate (x, y) represents the (x+1)th pixel on the (y+1)th line. Therefore, taking the coordinate (0, 0) as an example, it can be seen from this coordinate that the first pixel (pixel (0, 0)) on the first line is located in the memory 12 (memory A). Similarly, from the coordinate (0, 1), it can be seen that the first pixel (pixel (0, 1)) on the second line is located in the memory 13 (memory B).

By referencing FIG. 3, the memory access control unit 11 can see that the memory 12 stores the pixel (0, 0), which represents an image data piece of x=0 and y=0; the pixel (1,1), which represents an image data piece of x=1 and y=1; the pixel (1,2), which represents an image data piece of x=1 and y=2; the pixel (0, 3), which represents an image data piece of x=0 and y=3; and so on. Similarly, the memory access control unit 11 can see that the memory 13 stores the pixel (1,0), which represents an image data piece of x=1 and y=0; the pixel (0, 1), which represents an image data piece of x=0 and y=1; the pixel (0, 2), which represents an image data piece of x=0 and y=2; the pixel (1, 3), which represents an image data piece of x=1 and y=3; and so on.

Furthermore, if we assume that the discrete address of the memory 12 is ADA (described later), then the pixel (0, 0), which represents an image data piece of x=0 and y=0, is stored at ADA=0 in the memory 12; the pixel (1,1), which represents an image data piece of x=1 and y=1, is stored at ADA=1 in the memory 12; the pixel (1,2), which represents an image data piece of x=1 and y=2, is stored at ADA=2 in the memory 12; the pixel (0, 3), which represents an image data piece of x=0 and y=3, is stored at ADA=3 in the memory 12; and the rest of the pixels are stored in a similar manner (refer to FIG. 4 described below).

Figure 5:
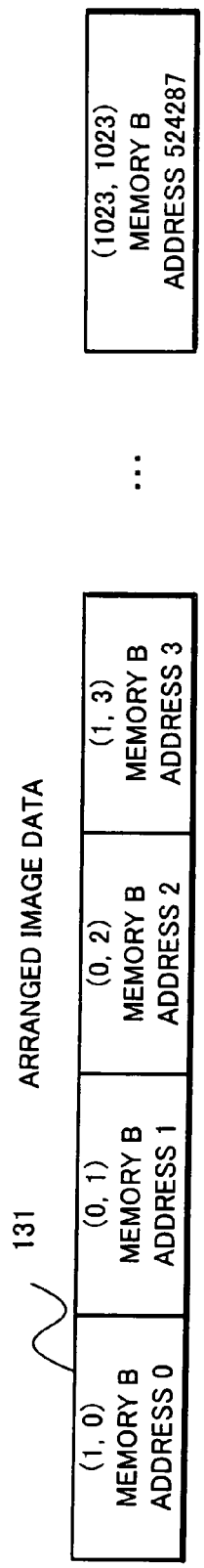
FIG. 5 is a diagram which illustrates example data stored in a memory 13 according to the first exemplary embodiment.

If we further assume that the discrete address of the memory 13 is ADB (described later), then the pixel (1, 0), which represents an image data piece of x=1 and y=0, is stored at ADB=0 in the memory 13; the pixel (0,1), which represents an image data piece of x=0 and y=1, is stored at ADB=1 in the memory 13; the pixel (0, 2), which represents an image data piece of x=0 and y=2, is stored at ADB=2 in the memory 13; the pixel (1, 3), which represents an image data piece of x=1 and is stored at ADB=3 in the memory 13; and the rest of the pixels are stored in a similar manner (refer to FIG. 5 described below).

In the memories 12, 13 of this exemplary embodiment, the image data are arranged in such a manner that, with respect to every two consecutive pixels on a line, four consecutive lines are grouped into one block. In other words, one block consists of image data of 8 pixels (2 pixels multiplied by 4 lines).

For example, if we assume that the least significant bit on the x coordinate is "a," and that the two least significant bits on the y coordinate is "b," the information contained in this particular block will look as shown in FIG. 6.

Thus, the image data of 1024 pixels×1024 lines of this exemplary embodiment are divided into 512 blocks described above in lateral direction (i.e., x-axis direction) and 256 blocks described above in longitudinal direction (y-axis direction), creating 131072 blocks in total. Pieces of pixel data which individually form these 131072 blocks are stored in the memories 12, 13 in the arrangements shown in FIGS. 4 and 5 (described later).

Each of the memories 12, 13 has a function to store coded and arranged image data 121, 131, based on the image data location information 161.

Figure 4:
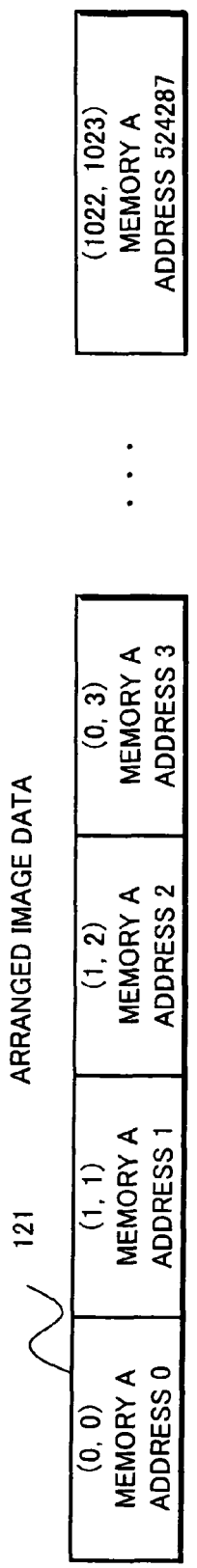
FIG. 4 is a diagram which illustrates example data stored in a memory 12 according to the first exemplary embodiment.

FIG. 4 is a diagram which shows example data (arranged image data 121) stored in the memory 12. FIG. 5 is a diagram which shows example data (arranged image data 131) stored in the memory 13.

The memories 12, 13 may not only consist of a single memory, but also of two groups of memories 12, 13 each with the same memory capacity.

When accessing the data of pixels forming the image data stored in the memories 12, 13, the access mode selection unit 14 (FIG. 1) selects the following access modes: a mode to access two laterally consecutive pixels at a time; a mode to access vertically (longitudinally) consecutive two pixels at a time; and a mode to access two pixels on vertically (longitudinally) alternate lines at a time.

The discrete address correspondence information storage unit 15 stores discrete address correspondence information 151 which indicates correspondence between each ADA and each ADB with respect to each of the access modes.

FIG. 7 is a diagram which shows discrete address correspondence information stored in the discrete address correspondence information storage unit 15.

Referring to FIG. 7, the discrete address correspondence information 151 (151*a*-1151*c*) stored in the discrete address correspondence information storage unit 15 is indicated as described below.

In the access mode in which two laterally consecutive pixels are accessed at a time, ADA=ADB (discrete address correspondence information 151*a*).

In the access mode in which two vertically (longitudinally) consecutive pixels are accessed at a time, ADA=0 and ADB=1, ADA=1 and ADB=0, ADA=2 and ADB=3, and ADA=3 and ADB=2 correspond to each other, respectively (discrete address correspondence information 151*b*).

In the access mode in which two pixels on vertically (longitudinally) alternate lines are accessed at a time, ADA=0 and ADB=2, ADA=1 and ADB=3, ADA=2 and ADB=0, and ADA=3 and ADB=1 correspond to each other, respectively (discrete address correspondence information 151*c*).

As described later, in cases where ADA and ADB are defined by address numbers as shown in FIG. 3, rather than by the two least significant bits of an address, discrete address correspondence information 151*d* is used in the mode in which two laterally consecutive pixels are accessed at a time; discrete address correspondence information 151*e* is used in the mode in which two laterally consecutive pixels are accessed at a time; and discrete address correspondence information 151*f* is used in the mode in which two pixels on vertically (longitudinally) alternate lines are accessed at a time (refer to FIG. 8).

Address signals 17 to 19 (FIG. 1) consist of an address signal 17 which communicates AD, which is a common address, from the memory access control unit 11 to the memories 12, 13; an address signal 18 which relates to ADA in the two least significant bits and which is sent from the memory access control unit 11 to the memory 12; and an address signal 19 which relates to ADB in the two least significant bits and which is sent from the memory access control unit 11 to the memory 13. The address signal sent from the memory access control unit 11 to the memory 12 and the address signal sent from the memory access control unit 11 to the memory 13 are the same, except for the two least significant bits, ADA and ADB.

Therefore, based on "AD" in the address signal 17, the one block that is common between the memories 12, 13 is identified from the 131072 blocks described above. From the one identified block, a pixel data piece within the memory 12 is identified based on "ADA" in the address signal 18, and a pixel data piece within the memory 13 is identified based on "ADB" in the address signal 19.

In general, "AD" is [n1: n2], where n1 and n2 are determined by the image data, memory capacity, the number of bits in the address and other factors. In this particular exemplary embodiment, the image data 201 formed of 1024 pixels by 1024 lines is divided into 512 lateral blocks and 256 longitudinal blocks (512×256 blocks in total). Since this can be represented as 2 to the 17th power, n1=16. Also since each block consists of 2×4 pixels and can be represented as 2 to the 3rd power, n2=2.

A hardware configuration of the memory access control device 10 will now be described.

Figure 9:
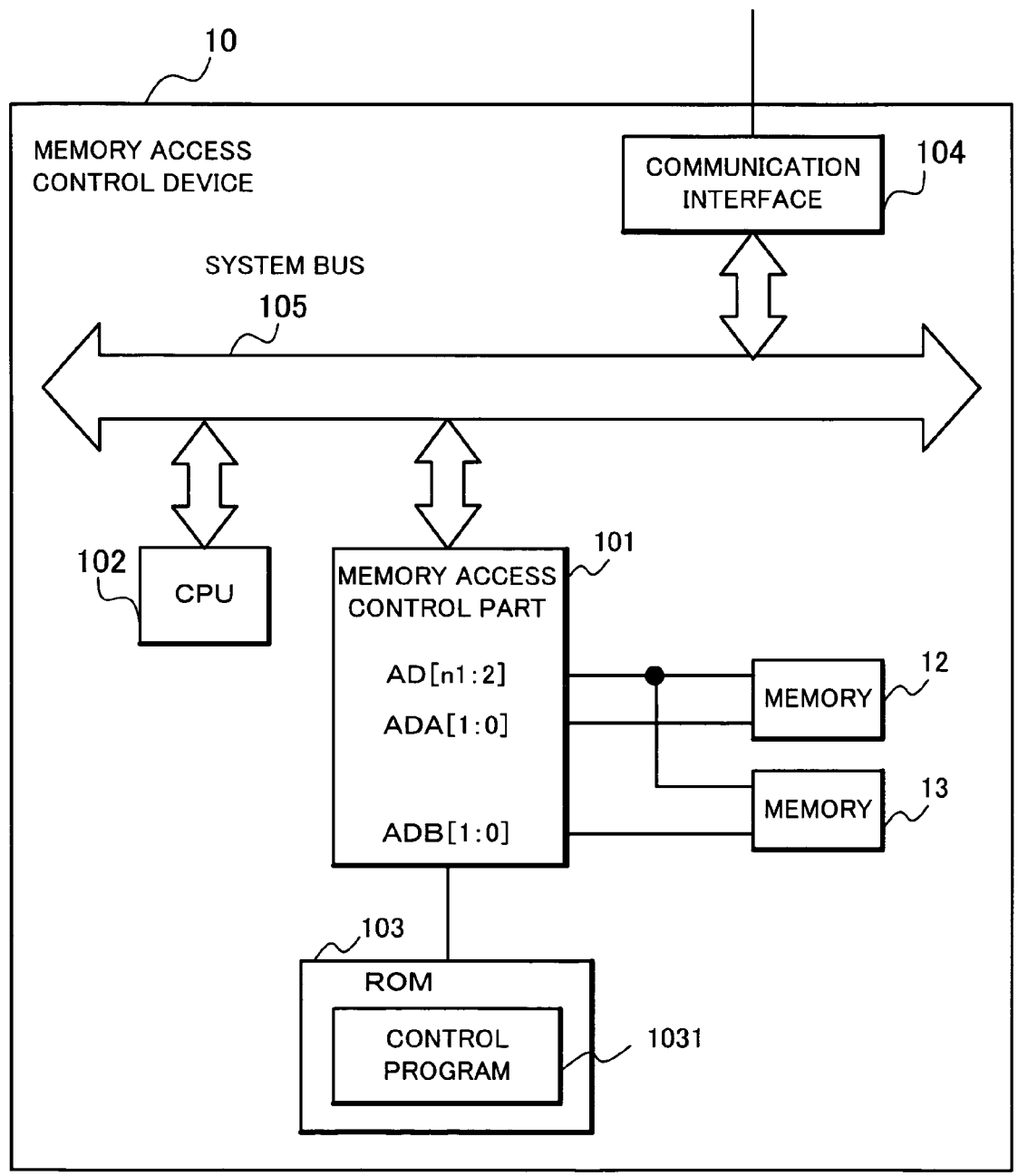
FIG. 9 is a block diagram which shows a hardware configuration of the memory access control device 10 according to the first embodiment.

FIG. 9 is a block diagram which shows a hardware configuration of the memory access control device 10 according to this exemplary embodiment.

With reference to FIG. 9, the memory access control device 10 according to the present invention can be realized in a hardware configuration similar to those of general computer devices, and comprises a memory access control part 101 which has the units 14-16 shown in FIG. 1; a memory 12 and a memory 13; a CPU (Central Processing Unit) 102; a communication interface 104 which transmits and receives data to and from peripheral equipment; a ROM (Read Only Memory) 103 which stores a control program 1031 providing the respective functions of the components described above; a system bus 105 which connects these components of this information processing device among one another; and so on.

It goes without saying that the operations of the memory access control device 10 according to the invention can be realized in hardware form by implementing within the memory access control device 10 a circuit component which consists of an LSI (Large Scale Integration) or other hardware parts into which a program that realizes these functions is incorporated, but these operations can also be realized in software form by causing the control program 1031 to be executed by the CPU 102 running on a computer processing device.

(Operation of First Exemplary Embodiment)

Figure 10:
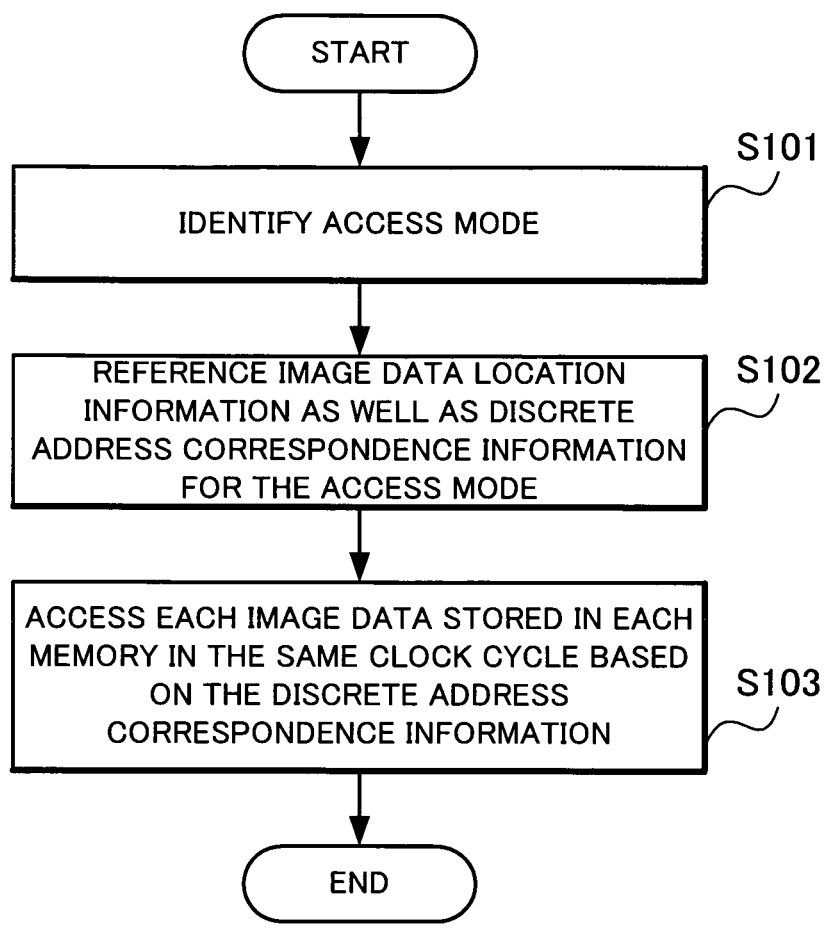
FIG. 10 is a flow chart which schematically shows the operation of the memory access control device 10 according to the first embodiment.

FIG. 10 is a flow chart which schematically shows the operation of the memory access control device 10 according to this exemplary embodiment. With reference to FIG. 10, the operation of the memory access control device 10 will schematically be described below.

First, the memory access control unit 11 identifies the access mode selected by the access mode selection unit 14 (step S101); based on the identified access mode, references the image data location information 161 stored in the image data location information storage unit 16 and the discrete address correspondence information 151$f$ or such access mode stored in the discrete address correspondence information storage unit 15 (step S102); and, based on the discrete address correspondence information 151, accesses in the same clock cycle the two sets of image data in the memories 12, 13 which correspond to each other (step S103).

Next, the operation performed in each of the different access modes will be described.

(Lateral Access Mode)

With reference to FIG. 3, an access method used by the memory access control device 10 according to this exemplary embodiment will be described. In this access method, when the access mode to access two horizontally (laterally) consecutive pixels at a time is selected, the memory access control unit 11 accesses the laterally consecutive pixels stored in the memories 12, 13, at a time.

If ADA and ADB are of the same value, the memory access control unit 11 can access the two laterally consecutive pixels stored in the memory 12 and the memory 13, at a time.

If it is found that, for example, ADA=ADB=0, based on the discrete address correspondence information 151$a$, then the memory access control unit 11 can access two laterally consecutive pixels, i.e., the pixel (0, 0) stored in the memory 12 and the pixel (1, 0) stored in the memory 13, at a time.

Similarly, if ADA=ADB=1, then the memory access control unit 11 can access two laterally consecutive pixels, i.e., the pixel (0, 1) stored in the memory 13 and the pixel (1, 1) stored in the memory 12, at a time.

However, unlike in the case of ADA=ADB=0 where data of the pixel (0, 0) is stored in the memory 12, in the case of ADA=ADB=1, the pixel (1, 1) data, whose x-coordinate value is different from the pixel (0, 0) above, is stored in the memory 12.

Similarly, unlike in the case of ADA=ADB=0 where the pixel (1, 0) data is stored in the memory 13, in the case of ADA=ADB=1, data of the pixel (0, 1), whose x-coordinate value is different from the (1, 0) above is stored in the memory 13.

In the case of ADA=ADB=2, the order in which the data are stored is similar to ADA=ADB=1 (first the pixel (0, 2) stored in the memory 13, followed by the pixel (1, 2) stored in the memory 12). In the case of ADA=ADB=3, the order in which the data are stored is similar to ADA=ADB=0 (first the pixel (0, 3) stored in the memory 12, followed by the pixel (1, 3) stored in the memory 13).

It should, however, be noted that in cases where ADA and ADB are defined using address numbers in FIG. 3, rather than using the lowest two bits of an address, the same address is assigned to two pixels in the image data of 1024 pixels×1024 lines shown in FIG. 2, and therefore the number of addresses is 1024×1024÷2=524288. In this case, if 1≤h≤524288 and if the mode to access two horizontally (laterally) consecutive pixels at a time is selected, ADA=ADB=(h−1) is determined in accordance with the selected ADA or the selected ADB (as shown in the discrete address correspondence information 151$d$ in FIG. 8). The memory access control unit 11 can thus access the two laterally consecutive pixels stored at the selected addresses in the memories 12, 13 at a time.

(Longitudinal Access Mode)

With reference to FIG. 3, another access method used by the memory access control device 10 according to this exemplary embodiment will be described. In this access method, when the access mode to access two vertically (longitudinally) consecutive pixels at a time is selected, the memory access control unit 11 accesses the longitudinally consecutive pixels stored in the memories 12, 13, at a time.

If it is found that, for example, ADA=0 and ADB=1, based on the discrete address correspondence information 151$b$, the memory access control unit 11 can access the pixel (0, 0) stored in the memory 12 and the pixel (0, 1) stored in the memory 13, and thus can access data on two longitudinally consecutive lines at a time.

In cases where ADA and ADB are defined by address numbers as shown in FIG. 3, rather than by the lowest two bits of an address, the last ADA in FIG. 3 which corresponds to ADA=0 is ADA=524284 (ADA=524284 is not explicitly illustrated in FIG. 3). Since there are four addresses in one block described above, the number of blocks is 524284÷4=131071. If 1:5≤i≤5131072 and if ADA=(4i−4) and ADB=ADA+1=(4i−4)+1=4i−3 (based on discrete address correspondence information 151$e$ in FIG. 8), the memory access control unit 11 can access data on two longitudinally consecutive lines at a time, similarly to when ADA=0 and ADB=1 are used.

In other words, in cases where the mode to access two vertically (longitudinally) consecutive pixels at a time is selected as a method to access the image data of 1024 pixels by 1024 lines shown in FIG. 2, if ADA=(4i−4) is selected, its corresponding ADB=(4i−3) is selected, and if ADB=(4i−3) is selected, its corresponding ADA=(4i−4) is selected, based on the discrete address correspondence information 151$e$. By this, the memory access control unit 11 can access two longitudinally consecutive pixels stored at the selected addresses in the memories 12, 13 at a time.

In cases where ADA and ADB are defined by the lowest two bits of an address, if ADA=3 and ADB=2, the memory access control unit 11 can access the pixel (0, 3) stored in the memory 12 and the pixel (0, 2) stored in the memory 13 at a time, similarly to the above.

In cases where ADA and ADB are defined by address numbers as shown in FIG. 3, rather than by the lowest two bits of an address, the last ADA in FIG. 3 which corresponds to ADA=3 is ADA=524287. If $1 \leq i \leq 131072$ and if ADA=(4i−4)+3=(4i−1) and ADB=ADA−1=(4i−4)−1=4i−2 (based on discrete address correspondence information 151e in FIG. 8), the memory access control unit 11 can access data on two longitudinally consecutive lines at a time, similarly to when ADA=3 and ADB=2 are used.

In other words, in cases where the mode to access two vertically (longitudinally) consecutive pixels at a time is selected as a method to access the image data of 1024 pixels by 1024 lines shown in FIG. 2, if ADA=(4i−1) is selected, its corresponding ADB=(4i−2) is selected, and if ADB=(4i−2) is selected, its corresponding ADA=(4i−1) is selected, based on the discrete address correspondence information 151e. By this, the memory access control unit 11 can access two longitudinally consecutive pixels stored at the selected addresses in the memories 12, 13 at a time.

In cases where ADA and ADB are defined by the lowest two bits of an address, if ADA=1 and ADB=0, the memory access control unit 11 can access the pixel (1, 1) stored in the memory 12 and the pixel (1, 0) stored in the memory 13 at a time, similarly to the above.

In cases where ADA and ADB are defined by address numbers as shown in FIG. 3, rather than by the lowest two bits of an address, the last ADA in FIG. 3 which corresponds to ADA=1 is ADA=524285. If $1 \leq i \leq 131072$ and if ADA=(4i−4)+1(4i−3) and ADB=ADA−1=(4i−3)−1=4i−4(based on discrete address correspondence information 151e in FIG. 8), the memory access control unit 11 can access data on two longitudinally consecutive lines at a time, similarly to when ADA=1 and ADB=0 are used.

In other words, in cases where the mode to access two vertically (longitudinally) consecutive pixels at a time is selected as a method to access the image data of 1024 pixels by 1024 lines shown in FIG. 2, if ADA=(4i−3) is selected, its corresponding ADB=(4i−4) is selected, and if ADB=(4i−4) is selected, its corresponding ADA=(4i−3) is selected, based on the discrete address correspondence information 151e. By this, the memory access control unit 11 can access two longitudinally consecutive pixels stored at the selected addresses in the memories 12, 13 at a time.

In cases where ADA and ADB are defined by the lowest two bits of an address, if ADA=2 and ADB=3, the memory access control unit 11 can access the pixel (1, 2) stored in the memory 12 and the pixel (1, 3) stored in the memory 13 at a time, similarly to the above.

In cases where ADA and ADB are defined by address numbers as shown in FIG. 3, rather than by the lowest two bits of an address, the last ADA in FIG. 3 which corresponds to ADA=2 is ADA=524286. If $1 \leq i \leq 131072$ and if ADA=(4i−4)+2=(4i−2) and ADB=ADA+1=(4i−2)+1=4i−1(based on discrete address correspondence information 151e in FIG. 8), the memory access control unit 11 can access data on two longitudinally consecutive lines at a time, similarly to when ADA=2 and ADB=3 are used.

In other words, in cases where the mode to access two vertically (longitudinally) consecutive pixels at a time is selected as a method to access the image data of 1024 pixels by 1024 lines shown in FIG. 2, if ADA=(4i−2) is selected, its corresponding ADB=(4i−1) is selected, and if ADB=(4i−1) is selected, its corresponding ADA=(4i−2) is selected, based on the discrete address correspondence information 151e. By this, the memory access control unit 11 can access two longitudinally consecutive pixels stored at the selected addresses in the memories 12, 13 at a time.

The foregoing is a description of how all the combinations of two lines can be accessed at a time. However, since the above-described block is configured to be formed with 8-pixel image data, it is impossible to access two consecutive lines beginning with an odd line at a time. This is because, in an access to two consecutive lines beginning with the second line in a block described above, different addresses in the same memory are accessed. Furthermore, in an access to two consecutive lines beginning with the fourth line in a block described above, addresses must be accessed across two blocks. This means that, if $1 < j \leq 1024$, data on two consecutive lines that begin with the (4j−2)th line or those that begin with the (4j)th line in FIG. 3 cannot be accessed at a time.

When rendering moving images, however, one often needs to access alternate lines in the moving image data. On such occasions, a pair of data on alternate lines within a block described above can be accessed at a time by using the following method.

In the description below, yet another access method used by the memory access control device 10 according to this exemplary embodiment will be explained. In this access method, when the access mode to access two pixels on vertically (longitudinally) alternate lines at a time is selected, the memory access control unit 11 accesses the longitudinally alternate lines for the pixels stored in the memories 12, 13, at a time.

If it is found that, for example, ADA=0 and ADB=2, based on the discrete address correspondence information 151c, the memory access control unit 11 can access two alternate lines for the pixel (0, 0) stored in the memory 12 and the pixel (0, 2) stored in the memory 13, at a time.

In cases where ADA and ADB are defined by address numbers as shown in FIG. 3, rather than by the lowest two bits of an address and where $1 \leq i \leq 131072$ is assumed in FIG. 3, the memory access control unit 11 can access data on two longitudinally alternate lines at a time if ADA=(4i−4) and ADB=ADA+2=(4i−4)+2=4i−2(based on discrete address correspondence information 151f in FIG. 8), similarly to when ADA=0 and ADB=2 are used.

In other words, in cases where the mode to access two pixels on vertically (longitudinally) alternate lines at a time is selected as a method to access the image data of 1024 pixels by 1024 lines shown in FIG. 2, if ADA=(4i−4) is selected, its corresponding ADB=(4i−2) is selected, and if ADB=(4i−2) is selected, its corresponding ADA=(4i−4) is selected, based on the discrete address correspondence information 151f. By this, the memory access control unit 11 can access two longitudinally alternate pixels stored at the selected addresses in the memories 12, 13 at a time.

Similarly to the above, in cases where ADA and ADB are defined by the lowest two bits of an address, if ADA=3 and ADB=1, the memory access control unit 11 can access two alternate lines for the pixel (0, 3) stored in the memory 12 and the pixel (0, 1) stored in the memory 13 at a time.

In cases where ADA and ADB are defined by address numbers as shown in FIG. 3, rather than by the lowest two bits of an address and if, assuming $1 \leq i \leq 131072$, ADA=(4i−1) and ADB=ADA−2=(4i−1)−2=4i−3(based on discrete address correspondence information 151f in FIG. 8), the memory access control unit 11 can access data on two longitudinally alternate lines at a time, similarly to when ADA=3 and ADB=1 are used.

In other words, in cases where the mode to access two pixels on vertically (longitudinally) alternate lines at a time is selected as a method to access the image data of 1024 pixels by 1024 lines shown in FIG. 2, if ADA=(4i−1) is selected, its corresponding ADB=(4i−3) is selected, and if ADB=(4i−3) is selected, its corresponding ADA=(4i−1) is selected, based on the discrete address correspondence information 151$f$. By this, the memory access control unit 11 can access two longitudinally alternate pixels stored at the selected addresses in the memories 12, 13 at a time.

Similarly to the above, in cases where ADA and ADB are defined by the lowest two bits of an address, if ADA=2 and ADB=0, the memory access control unit 11 can access two alternate lines for the pixel (1, 2) stored in the memory 12 and the pixel (1, 0) stored in the memory 13 at a time.

In cases where ADA and ADB are defined by address numbers as shown in FIG. 3, rather than by the lowest two bits of an address and if, assuming 1≤i≤31072, ADA=(4i−2) and ADB=ADA−2=(4i−2)−2=4i=4 (based on discrete address correspondence information 151$f$ in FIG. 8), the memory access control unit 11 can access data on two longitudinally alternate lines at a time, similarly to when ADA=2 and ADB=0 are used.

In other words, in cases where the mode to access two pixels on vertically (longitudinally) alternate lines at a time is selected as a method to access the image data of 1024 pixels by 1024 lines shown in FIG. 2, if ADA=(4i−2) is selected, its corresponding ADB=(4i−4) is selected, and if ADB=(4i−4) is selected, its corresponding ADA=(4i−2) is selected, based on the discrete address correspondence information 151$f$. By this, the memory access control unit 11 can access two pixels on longitudinally alternate lines stored at the selected addresses in the memories 12, 13 at a time.

Similarly to the above, in cases where ADA and ADB are defined by the lowest two bits of an address, if ADA=1 and ADB=3, the memory access control unit 11 can access two alternate lines for the pixel (1, 1) stored in the memory 12 and the pixel (1, 3) stored in the memory 13 at a time.

In cases where ADA and ADB are defined by address numbers as shown in FIG. 3, rather than by the lowest two bits of an address and if, assuming 1≤i≤131072, ADA=(4i−3) and ADB=ADA+2=(4i−3)+2=4i−1(based on discrete address correspondence information 151$f$ in FIG. 8), the memory access control unit 11 can access data on two longitudinally alternate lines at a time, similarly to when ADA=1 and ADB=3 are used.

In other words, in cases where the mode to access two pixels on vertically (longitudinally) alternate lines at a time is selected as a method to access the image data of 1024 pixels by 1024 lines shown in FIG. 2, if ADA=(4i−3) is selected, its corresponding ADB=(4i−1) is selected, and if ADB=(4i−1) is selected, its corresponding ADA=(4i−3) is selected, based on the discrete address correspondence information 151$f$. By this, the memory access control unit 11 can access two pixels on longitudinally alternate lines stored at the selected addresses in the memories 12, 13 at a time.

The foregoing is a description of how all the combinations of two alternate lines in a block described above can be accessed at a time. It should, however, be noted that it is not possible to access alternate lines which begin with the second line or the third line in a block described above, at a time. This is because, in an access to two alternate lines which begin with the third or the fourth line in a block in the description above, addresses must be accessed across two blocks. This means that, if 1≤j≤1024, data on two alternate lines that begin with the (4j−1)th line or those that begin with the (4j)th line in FIG. 3 cannot be accessed at a time.

(Effects of First Exemplary Embodiment)

According to this exemplary embodiment, as shown in FIG. 3, two consecutive pixel data, within all the pixel data which form image data, correspond to each other with respect to each of the access modes and are separately stored in the memory 12 and the memory 13. By this, access to laterally consecutive image data and access to longitudinally consecutive image data can be mutually compatible. In addition, unnecessary accesses from the memory access control unit 11 to image data stored in the memory 12 and the memory 13 can be reduced, and thus higher memory access efficiency can be achieved.

In other words, according to this exemplary embodiment, data of laterally and longitudinally consecutive pixels in the image data are stored in predetermined locations within two memories, in correspondence with each other and in a simultaneously accessible manner. By independently controlling part of the access addresses given to the two memories, unnecessary data access events can be completely eliminated in lateral access. In the case of longitudinal access as well, unnecessary data access events can significantly be reduced from the level achieved by the related arts described in the section of "TECHNICAL FIELD."

Moreover, according to this exemplary embodiment, each access address given to two groups of memory (the memories 12, 13) is configured to be identical except for two bits. By this, the number of access address signal lines can be reduced to smaller than when access addresses given to the two groups of memory are entirely different from each other.

(Second Exemplary Embodiment)

This exemplary embodiment differs from the first exemplary embodiment in that the bus width per memory for the memories 12, 13 is increased to 16 bits from 8 bits as in the first exemplary embodiment. If the bus width per memory is 16 bits and if one pixel is 8 bits long, two pixels can be stored per address in each of the memories. Differences of this exemplary embodiment from the first exemplary embodiment will be described below.

(Configuration of Second Exemplary Embodiment)

FIG. 11 is a diagram which illustrates the image data location information 161 generated based on the image data 201 shown in FIG. 2, the memory capacities of the memories 12 and 13, the bus width per memory and so on.

Figure 12:
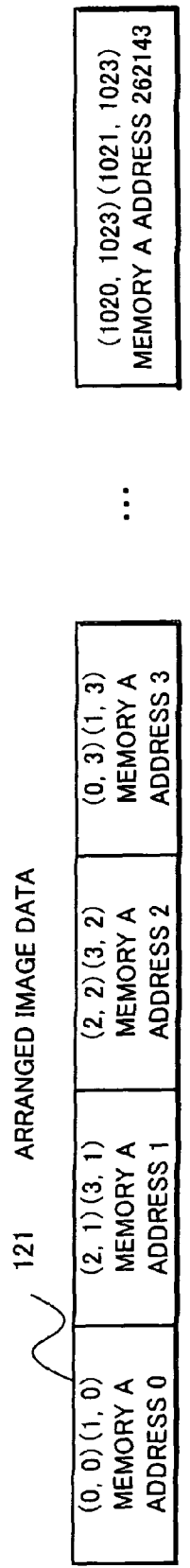
FIG. 12 is a diagram which illustrates example data stored in a memory 12 according to the second exemplary embodiment.
Figure 13:
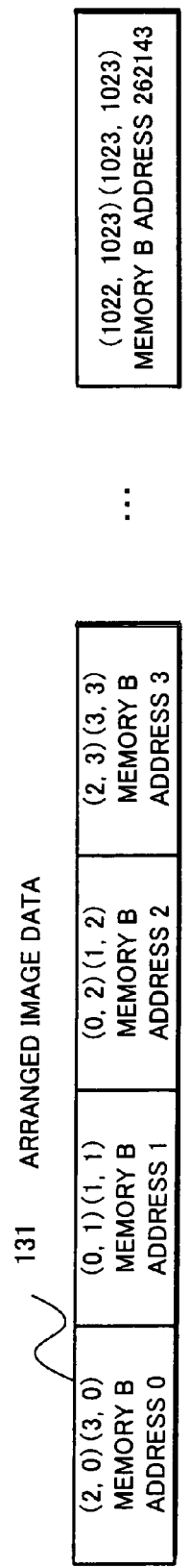
FIG. 13 is a diagram which illustrates example data stored in a memory 13 according to the second exemplary embodiment.

Similarly to the first embodiment, the memories 12, 13 according to this exemplary embodiment respectively store image data of 1024 pixels by 1024 lines shown in FIG. 2 in the arrangements shown in FIGS. 12 and 13, based on the image data location information 161 shown in FIG. 11.

FIG. 12 is a diagram which shows example data (arranged image data 121) stored in the memory 12. FIG. 13 is a diagram which shows example data (arranged image data 131) stored in the memory 13.

In the memories 12, 13 of this exemplary embodiment, the image data are arranged in such a manner that, with respect to every four consecutive pixels on a line, four consecutive lines are grouped into one block. In other words, one block consists of image data of 16 pixels (4 pixels multiplied by 4 lines).

For example, if we assume that the least significant bit on the x coordinate is "a," and that the two least significant bits on the y coordinate is "b" in the image data, the information contained in this particular block will look as shown in FIG. 14.

Thus, the image data of 1024 pixels x 1024 lines of this exemplary embodiment are divided into 256 blocks described above in lateral direction (i.e., x-axis direction) and 256 blocks described above in longitudinal direction (y-axis direction), creating 65536 blocks in total. Pieces of pixel data which individually form these 65536 blocks are stored in the memories 12, 13 in the arrangement shown in FIG. 11.

Similarly to the first exemplary embodiment, the discrete address correspondence information storage unit 15 of this exemplary embodiment stores discrete address correspondence information 151 which indicates correspondence between each ADA and each ADB with respect to each of the access modes.

As described later, in cases where ADA and ADB are defined by address numbers as shown in FIG. 3, rather than by the lowest two bits of an address, discrete address correspondence information 151g is used in the mode in which two laterally consecutive pixels are accessed at a time; discrete address correspondence information 151h is used in the mode in which two laterally consecutive pixels are accessed at a time; and discrete address correspondence information 151i is used in the mode in which two pixels on vertically (longitudinally) alternate lines are accessed at a time (refer to FIG. 15).

(Operation of Second Exemplary Embodiment)

(Lateral Access Mode)

First, with reference to FIG. 11, an access method used by the memory access control device 10 according to this exemplary embodiment will be described. In this access method, when the access mode to access two horizontally (laterally) consecutive pixels at a time is selected, the memory access control unit 11 accesses the laterally consecutive pixels stored in the memories 12, 13, at a time (see FIGS. 12 and 13).

If ADA and ADB are of the same value, the memory access control unit 11 can access the four laterally consecutive pixels stored in the memory 12 and the memory 13, at a time.

If it is found that, for example, ADA=ADB=0, based on the discrete address correspondence information 151a, the memory access control unit 11 can access four laterally consecutive pixels, i.e., the pixels (0, 0) and (1, 0) stored in the memory 12 and the pixels (2, 0) and (3, 0) stored in the memory 13, at a time.

Similarly, if ADA=ADB=1, then the memory access control unit 11 can access four laterally consecutive pixels, i.e., the pixels (0, 1) and (1,1) stored on the memory 13 and the pixels (2, 1) and (3, 1) stored in the memory 12, at a time.

However, unlike in the case of ADA=ADB=0 where data of the pixels (0, 0) and (1, 0) are stored in the memory 12, if ADA=ADB=1, data of the pixels (2, 1) and (3, 1), whose x-coordinate values are different from that of the pixels (0, 0) and (1, 0) mentioned above, are stored in the memory 12.

Similarly, unlike in the case of ADA=ADB=0 where data of the pixels (2, 0) and (3, 0) are stored in the memory 13, in the case of ADA=ADB=1, data of the pixels (0, 1) and (1, 1), whose x-coordinates are different from the pixels (2, 0) and (3, 0) above, are stored in the memory 13.

In the case of ADA=ADB=2, the order in which the data are stored is similar to ADA=ADB=1 (first the pixels (0, 2) and (1, 2) stored in the memory 13, followed by the pixels (2, 2) and (3, 2) stored in the memory 12). In the case of ADA=ADB=3, the order in which the data are stored is similar to ADA=ADB=0 (first the pixels (0, 3) and (1, 3) stored in the memory 12, followed by the pixels (2, 3) and (3, 3) stored in the memory 13).

It should, however, be noted that if ADA and ADB are defined using address numbers in FIG. 11, rather than using the lowest two bits of an address, the same address is assigned to four pixels in the image data of 1024 pixels by 1024 lines shown in FIG. 2, and therefore the number of addresses is $1024 \times 1024 \div 4 = 262144$. In this case, if $1 \leq k \leq 262144$ and if the mode to access two horizontally (laterally) consecutive pixels at a time is selected, ADA=ADB=(k−1) is determined in accordance with the selected ADA or the selected ADB (as shown in the discrete address correspondence information 151g in FIG. 15). The memory access control unit 11 can thus access the two laterally consecutive pixels stored at the selected addresses in the memories 12, 13 at a time.

(Longitudinal Access Mode)

With reference to FIG. 11, another access method used by the memory access control device 10 according to this exemplary embodiment will be described. In this access method, when the access mode to access two vertically (longitudinally) consecutive pixels at a time is selected, the memory access control unit 11 accesses the longitudinally consecutive pixels stored in the memories 12, 13, at a time.

If it is found that, for example, ADA=0 and ADB=1, based on the discrete address correspondence information 151b, the memory access control unit 11 can access the pixels (0, 0) and (1, 0) stored on the memory 12 and the pixels (0, 1) and (1, 1) stored in the memory 13, and thus can access data on two longitudinally consecutive lines at a time with respect to two laterally consecutive pixels.

In cases where ADA and ADB are defined by address numbers as shown in FIG. 3, rather than by the two least significant bits of an address, the last ADA in FIG. 11 which corresponds to ADA=0 is ADA−262140 (ADA 262140 is not explicitly illustrated in FIG. 11). Since there are four addresses in one block described above, the number of blocks is $262140 \div 4 = 65535$. If $1 \leq l \leq 65536$ and if ADA=(4l−4) and ADB=ADA+1=(4l−4)+1=4l−3 (based on discrete address correspondence information 151h in FIG. 15), the memory access control unit 11 can access data on two longitudinally consecutive lines at a time with respect to two laterally consecutive pixels, similarly to when ADA-0 and ADB=1 are used.

In other words, in cases where the mode to access two vertically (longitudinally) consecutive pixels at a time is selected as a method to access the image data of 1024 pixels by 1024 lines shown in FIG. 2, if ADA=(4l−4) is selected, its corresponding ADB=(4l−3) is selected, and if ADB=(4l−3) is selected, its corresponding ADA(4l−4) is selected, based on the discrete address correspondence information 151h. By this, the memory access control unit 11 can access data on two longitudinally consecutive lines stored at the selected addresses in the memories 12, 13 at a time.

In cases where ADA and ADB are defined by the lowest two bits of an address, if ADA=3 and ADB=2, the memory access control unit 11 can access the pixels (0, 3) and (1,3) stored in the memory 12 and the pixels (0, 2) and (1, 2) stored in the memory 13 at a time, similarly to the above.

In cases where ADA and ADB are defined by address numbers as shown in FIG. 3, rather than by the lowest two bits of an address, the last ADA in FIG. 11 which corresponds to ADA=3 is ADA=62143. If $1 \leq l \leq 65536$ and if ADA=(4l−1) and ADB=ADA−1=(4l−1)−1=4l−2 (based on discrete address correspondence information 151h in FIG. 15), the memory access control unit 11 can access data on two longitudinally consecutive lines at a time with respect to two laterally consecutive pixels, similarly to when ADA=3 and ADB=2 are used.

In other words, in cases where the mode to access two vertically (longitudinally) consecutive pixels at a time is selected as a method to access the image data of 1024 pixels by 1024 lines shown in FIG. 2, if ADA=(4l−1) is selected, its corresponding ADB=(4l−2) is selected, and if ADB=(4l−2) is selected, its corresponding ADA=(4l−1) is selected, based on the discrete address correspondence information 151h. By this, the memory access control unit 11 can access data on two longitudinally consecutive lines stored at the selected addresses in the memories 12, 13 at a time.

In cases where ADA and ADB are defined by the lowest two bits of an address, if ADA=1 and ADB=0, the memory access control unit 11 can access the pixels (2, 1) and (3, 1) stored in the memory 12 and the pixels (2, 0) and (3, 0) stored in the memory 13 at a time, similarly to the above.

In cases where ADA and ADB are defined by address numbers as shown in FIG. 3, rather than by the lowest two bits of an address, the last ADA in FIG. 11 which corresponds to ADA=1 is ADA=262141. If 1≤l≤65536 and if ADA=(4l−3) and ADB=ADA−1=(4l−3)−1=4l−4 (based on discrete address correspondence information 151h in FIG. 15), the memory access control unit 11 can access data on two longitudinally consecutive lines at a time with respect to two laterally consecutive pixels, similarly to when ADA=1 and ADB=0 are used.

In other words, in cases where the mode to access two vertically (longitudinally) consecutive pixels at a time is selected as a method to access the image data of 1024 pixels by 1024 lines shown in FIG. 2, if ADA=(4l−3) is selected, its corresponding ADB=(4l−4) is selected, and if ADB=(4l−3) is selected, its corresponding ADA=(4l−4) is selected, based on the discrete address correspondence information 151h. By this, the memory access control unit 11 can access data on two longitudinally consecutive lines stored at the selected addresses in the memories 12, 13 at a time.

In cases where ADA and ADB are defined by the lowest two bits of an address, if ADA=2 and ADB=3, the memory access control unit 11 can access the pixels (2, 2) and (3, 2) stored in the memory 12 and the pixels (2, 3) and (3, 3) stored in the memory 13 at a time, similarly to the above.

In cases where ADA and ADB are defined by address numbers as shown in FIG. 3, rather than by the lowest two bits of an address, the last ADA in FIG. 11 which corresponds to ADA=2 is ADA=262142. If 1≤l≤65536 and if ADA=(4l−2) and ADB=ADA+1=(4l−2)+1=4l−1(based on discrete address correspondence information 151h in FIG. 15), the memory access control unit 11 can access data on two longitudinally consecutive lines at a time with respect to two laterally consecutive pixels, similarly to when ADA=2 and ADB=3 are used.

In other words, in cases where the mode to access two vertically (longitudinally) consecutive pixels at a time is selected as a method to access the image data of 1024 pixels by 1024 lines shown in FIG. 2, if ADA=(4l−2) is selected, its corresponding ADB=(4l−1) is selected, and if ADB=(4l−1) is selected, its corresponding ADA=(4l−2) is selected, based on the discrete address correspondence information 151h. By this, the memory access control unit 11 can access data on two longitudinally consecutive lines stored at the selected addresses in the memories 12, 13 at a time.

The foregoing is a description of how all the combinations of two pixels×two lines can be accessed at a time. However, since the above-described block is configured to be formed with 16-pixel image data, it is impossible to access two consecutive lines beginning with an odd line at a time. This is because, in an access to two consecutive lines beginning with the second line in a block described above, different addresses in the same memory are accessed. Furthermore, in an access to two consecutive lines beginning with the fourth line in a block described above, addresses must be accessed across two blocks. This means that, if 1≤m≤1024, data on two consecutive lines that begin with the (4m−2)th line or those that begin with the (4m)th line in FIG. 11 cannot be accessed at a time.

When rendering moving images, however, one often needs to access alternate lines in the moving image data. On such occasions, a pair of data on alternate lines within a block described above can be accessed at a time by using the following method.

In the description below, yet another access method used by the memory access control device 10 according to this exemplary embodiment will be explained. In this access method, when the access mode to access two pixels on vertically (longitudinally) alternate lines at a time is selected, the memory access control unit 11 accesses the two pixels on longitudinally alternate lines stored in the memories 12, 13, at a time.

If it is found that, for example, ADA=0 and ADB=2, based on the discrete address correspondence information 151c, the memory access control unit 11 can access two alternate lines for the pixels (0, 0) and (1, 0) stored on the memory 12 and the pixels (0, 2) and (1, 2) stored in the memory 13, at a time.

In cases where ADA and ADB are defined by address numbers as shown in FIG. 3, rather than by the lowest two bits of an address and where 1≤i≤65536 is assumed, the memory access control unit 11 can access data on two longitudinally alternate lines at a time if ADA=(4l−4) and ADB=ADA+2= (4l−4)+2=4l−2 (based on discrete address correspondence information 151i in FIG. 15) as shown in FIG. 11, similarly to when ADA=0 and ADB=2 are used.

In other words, in cases where the mode to access two pixels on vertically (longitudinally) alternate lines at a time is selected as a method to access the image data of 1024 pixels by 1024 lines shown in FIG. 2, if ADA=(4l−4) is selected, its corresponding ADB=(4l−2) is selected, and if ADB=(4l−2) is selected, its corresponding ADA(4l−4) is selected, based on the discrete address correspondence information 151i. By this, the memory access control unit 11 can access two pixels on longitudinally alternate lines stored at the selected addresses in the memories 12, 13 at a time.

Similarly to the above, in cases where ADA and ADB are defined by the lowest two bits of an address, if ADA=3 and ADB=1, the memory access control unit 11 can access two alternate lines for the pixels (0, 3) and (1, 3) stored in the memory 12 and the pixels (0, 1) and (1, 1) stored in the memory 13 at a time.

In cases where ADA and ADB are defined by address numbers as shown in FIG. 3, rather than by the lowest two bits of an address and where 1≤l≤65536 is assumed, the memory access control unit 11 can access data on two longitudinally alternate lines at a time if ADA=(4l−1) and ADB=ADA−2= (4l−1)−2=4l−3 (based on discrete address correspondence information 151i in FIG. 15) as shown in FIG. 11, similarly to when ADA=3 and ADB=1 are used.

In other words, in cases where the mode to access two pixels on vertically (longitudinally) alternate lines at a time is selected as a method to access the image data of 1024 pixels by 1024 lines shown in FIG. 2, if ADA=(4l−1) is selected, its corresponding ADB=(4l−3) is selected, and if ADB=(4l−3) is selected, its corresponding ADA=(4l−1) is selected, based on the discrete address correspondence information 151i. By this, the memory access control unit 11 can access two pixels on longitudinally alternate lines stored at the selected addresses in the memories 12, 13 at a time.

Similarly to the above, in cases where ADA and ADB are defined by the lowest two bits of an address, if ADA=2 and ADB=0, the memory access control unit 11 can access two alternate lines for the pixels (2, 2) and (3, 2) stored in the memory 12 and the pixels (2, 0) and (3, 0) stored in the memory 13 at a time.

In cases where ADA and ADB are defined by address numbers as shown in FIG. 3, rather than by the lowest two bits of an address and where 1≤l≤65536 is assumed, the memory access control unit 11 can access data on two longitudinally alternate lines at a time if ADA==(4l−2) and ADB=ADA−2=(4l−2)−2=4l−4 (based on discrete address correspondence information 151$i$ in FIG. 15) as shown in FIG. 11, similarly to when ADA=2 and ADB=0 are used.

In other words, in cases where the mode to access two pixels on vertically (longitudinally) alternate lines at a time is selected as a method to access the image data of 1024 pixels by 1024 lines shown in FIG. 2, if ADA=(4l−2) is selected, its corresponding ADB=(4l−4) is selected, and if ADB=(4l−4) is selected, its corresponding ADA=(4l−2) is selected, based on the discrete address correspondence information 151$i$. By this, the memory access control unit 11 can access two pixels on longitudinally alternate lines stored at the selected addresses in the memories 12, 13 at a time.

Similarly to the above, in cases where ADA and ADB are defined by the lowest two bits of an address, if ADA=1 and ADB=3, the memory access control unit 11 can access two alternate lines for the pixels (2, 1) and (3, 1) stored in the memory 12 and the pixels (2, 3) and (3, 3) stored in the memory 13 at a time.

In cases where ADA and ADB are defined by address numbers as shown in FIG. 3, rather than by the lowest two bits of an address and where 1≤i≤65536 is assumed, the memory access control unit 11 can access data on two longitudinally alternate lines at a time if ADA=(4l−3) and ADB=ADA+2=(4l−3)+2=4l−1 (based on discrete address correspondence information 151$i$ in FIG. 15) as shown in FIG. 11, similarly to when ADA=1 and ADB=3 are used.

In other words, in cases where the mode to access two pixels on vertically (longitudinally) alternate lines at a time is selected as a method to access the image data of 1024 pixels by 1024 lines shown in FIG. 2, if ADA=(4l−3) is selected, its corresponding ADB=(4l−1) is selected, and if ADB=(4l−1) is selected, its corresponding ADA=(4l−3) is selected, based on the discrete address correspondence information 151$i$. By this, the memory access control unit 11 can access two pixels on longitudinally alternate lines stored at the selected addresses in the memories 12, 13 at a time.

The foregoing is a description of how all the combinations of two pixels×two lines on alternate lines in a block described above can be accessed at a time. It should, however, be noted that it is not possible to access alternate lines at a time in the case where the alternate lines begin with the second line or the third line in a block as described above. This is because, in an access to the data on two alternate lines, where the alternate lines begin with the third or the fourth line in a block in the description above, addresses must be accessed across two blocks. This means that, if 1≤m≤1024, data on two alternate lines that begin with the (4m−1)th line or those that begin with the (4m)th line in FIG. 11 cannot be accessed at a time.

(Effects of Second Exemplary Embodiment)

According to this exemplary embodiment, even if the bus width per memory for the memories 12, 13 is increased to 16 bits from 8 bits as in the first exemplary embodiment, the effects similar to the first exemplary embodiment can be achieved by storing data of a plurality of laterally consecutive pixels at each address of the memories.

(Third Exemplary Embodiment)

This exemplary embodiment differs from the first exemplary embodiment in that each block is configured with two pixels by two lines (2x2) instead of two pixels by four lines (2x4) as in the first exemplary embodiment. Differences of this exemplary embodiment from the first exemplary embodiment will be described below.

(Configuration of Third Exemplary Embodiment)

FIG. 16 is a diagram which illustrates image data location information 161 according to this exemplary embodiment.

Figure 17:
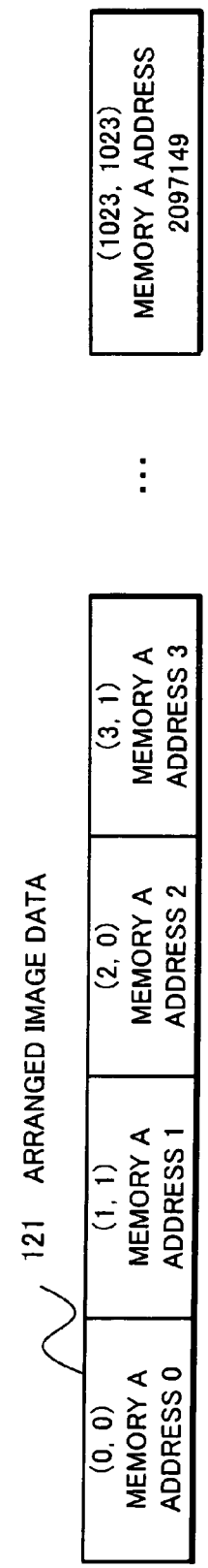
FIG. 17 is a diagram which illustrates example data stored in a memory 12 according to the third exemplary embodiment.

Similarly to the first embodiment, the memories 12, 13 according to this exemplary embodiment respectively store image data of 1024 pixels by 1024 lines shown in FIG. 2 in the arrangements shown in FIGS. 17 and 18, based on the image data location information 161 shown in FIG. 16.

FIG. 17 is a diagram which shows example data (arranged image data 121) stored in the memory 12. FIG. 18 is a diagram which shows example data (arranged image data 131) stored in the memory 13.

If we assume that the lowest bit on the x coordinate is "a," and that the lowest two bits on the y coordinate is "b," the information contained in this particular block will look as shown in FIG. 19.

Within the discrete address correspondence information 151, and in cases where 0≤ADA≤1, 0≤ADB≤1, the discrete address correspondence information 151 according to this exemplary embodiment corresponds to the access mode to access two laterally consecutive pixels at a time (refer to the discrete address correspondence information 151$a$, $d$ in FIGS. 7 and 8) as well as to the mode to access two vertically (longitudinally) consecutive pixels at a time (refer to the discrete address correspondence information 151$b$, $e$ in FIGS. 7 and 8).

(Operation of Third Exemplary Embodiment

Similarly to the first exemplary embodiment, the memory access control unit 11 according to this exemplary embodiment accesses the image data stored in the memories 12, 13 in the same clock cycle, using the access mode selected by the access mode selection unit 14 (see memory access control device 10 of FIG. 1), and based on the image data location information 161 and the discrete address correspondence information 151$f$ or such access mode.

(Effects of Third Exemplary Embodiment)

According to this exemplary embodiment, it is possible to achieve the same effects as the first exemplary embodiment, except that the mode to access two pixels on two vertically (longitudinally) alternate lines at a time is not available for selection.

(Fourth Embodiment)

This exemplary embodiment is a variation of the second embodiment. Differences of this exemplary embodiment from the second exemplary embodiment will be described below.

(Configuration of Fourth Exemplary Embodiment)

FIG. 20 is a diagram which illustrates image data location information 161 according to this exemplary embodiment.

Figure 21:
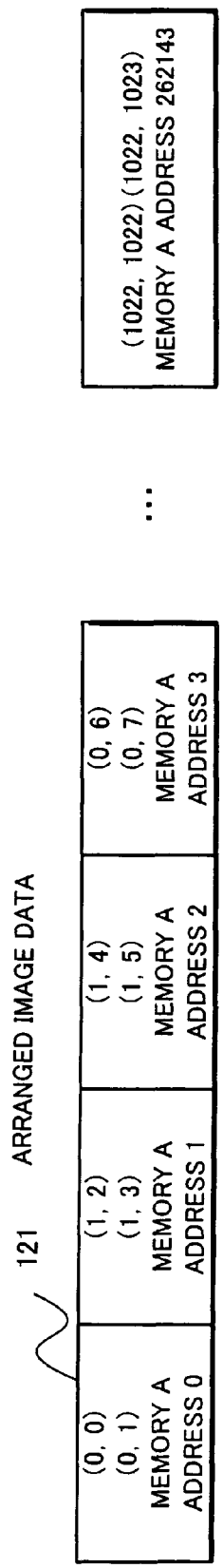
FIG. 21 is a diagram which illustrates example data stored in a memory 12 according to the fourth exemplary embodiment.
Figure 22:
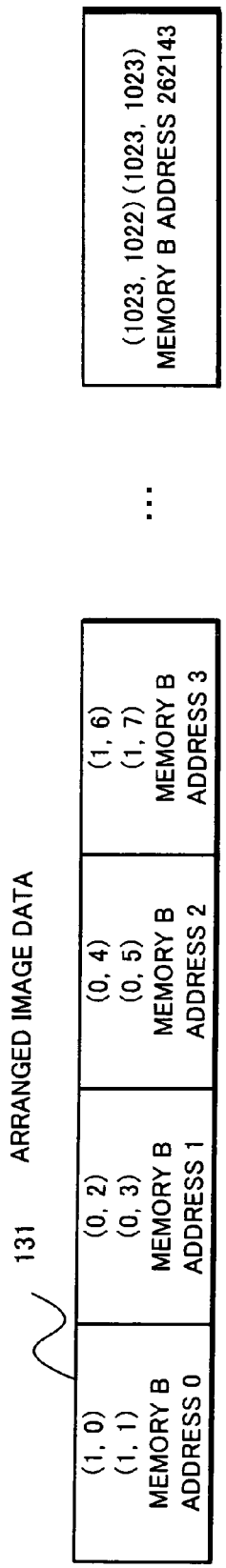
FIG. 22 is a diagram which illustrates example data stored in a memory 13 according to the fourth exemplary embodiment.

Similarly to the second embodiment, the memories 12, 13 according to this exemplary embodiment respectively store image data of 1024 pixels by 1024 lines shown in FIG. 2 in the arrangements shown in FIGS. 21 and 22, based on the image data location information 161 shown in FIG. 20.

FIG. 21 is a diagram which shows example data (arranged image data 121) stored in the memory 12. FIG. 22 is a diagram which shows example data (arranged image data 131) stored in the memory 13.

Figure 23:
FIG. 23 is a diagram which illustrates one block's worth of image data location information 161 according to the fourth exemplary embodiment.

If we assume that the lowest bit on the x coordinate is "a," and that the lowest two bits on the y coordinate is "b," the information contained in this particular block will look as shown in FIG. 23.

In other words, this exemplary embodiment differs from the second exemplary embodiment in that data of pixels stored at each address within a block are changed from two laterally consecutive pixels as in the second exemplary embodiment to two longitudinally consecutive pixels.

The discrete address correspondence information 151 according to this exemplary embodiment is the same as the discrete address correspondence information 151 according to the second exemplary embodiment.

(Operation of Fourth Exemplary Embodiment

Similarly to the second exemplary embodiment, the memory access control unit 11 according to this exemplary embodiment accesses the image data stored in the memories 12, 13 in the same clock cycle, using the access mode selected by the access mode selection unit 14, and based on the image data location information 161 and the discrete address correspondence information 151 for such access mode.

(Effects of Fourth Exemplary Embodiment)

According to this exemplary embodiment, it is possible to achieve the same effects as the second exemplary embodiment, even though data of pixels stored at each address within a block are longitudinally consecutive, rather than being laterally consecutive as in the second exemplary embodiment.

(Fifth Embodiment)

This exemplary embodiment differs from the second exemplary embodiment in that the bus width per memory for the memories 12, 13 is increased to 32 bits from 16 bits as in the second exemplary embodiment. If the bus width per memory is 32 bits and if one pixel is 8 bits long, four pixels can be stored per address in each of the memories. Differences of this exemplary embodiment from the second exemplary embodiment will be described below.

(Configuration of Fifth Exemplary Embodiment)

FIG. 24 is a diagram which illustrates image data location information 161 according to this exemplary embodiment.

Figure 26:
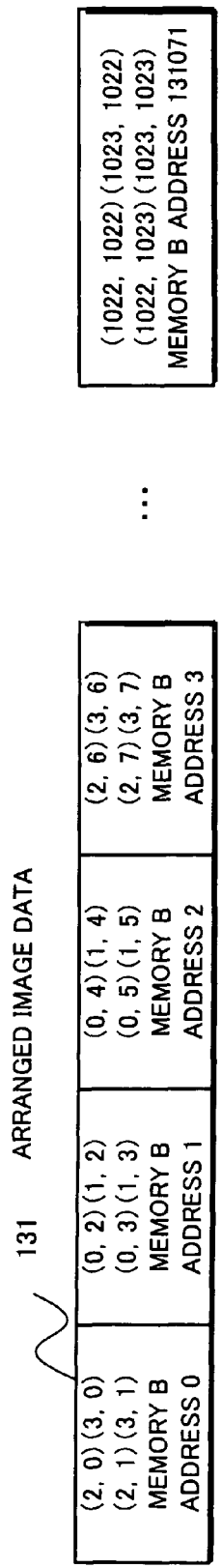
FIG. 26 is a diagram which illustrates example data stored in a memory 13 according to the fifth exemplary embodiment.

Similarly to the second embodiment, the memories 12, 13 according to this exemplary embodiment respectively store image data of 1024 pixels by 1024 lines shown in FIG. 2 in the arrangements shown in FIGS. 25 and 26, based on the image data location information 161 shown in FIG. 24.

FIG. 25 is a diagram which shows example data (arranged image data 121) stored in the memory 12. FIG. 26 is a diagram which shows example data (arranged image data 131) stored in the memory 13.

If we assume that the lowest bit on the x coordinate is "a," and that the lowest two bits on the y coordinate is "b," the information contained in this particular block will look as shown in FIG. 27.

In other words, this exemplary embodiment differs from the second exemplary embodiment in that data of pixels stored at each address within a block are changed from two laterally consecutive pixels as in the second exemplary embodiment to two laterally consecutive pixels and two longitudinally consecutive pixels.

The discrete address correspondence information 151 according to this exemplary embodiment is the same as the discrete address correspondence information 151 according to the second exemplary embodiment.

(Operation of Fifth Exemplary Embodiment)

Similarly to the second exemplary embodiment, the memory access control unit 11 according to this exemplary embodiment accesses the image data stored in the memories 12, 13 in the same clock cycle, using the access mode selected by the access mode selection unit 14, and based on the image data location information 161 and the discrete address correspondence information 151 for such access mode.

(Effects of Fifth Exemplary Embodiment)

According to this exemplary embodiment, it is possible to achieve the same effects as the second exemplary embodiment, even though the bus width per memory for the memories 12, 13 is increased from 16 bits as in the second exemplary embodiment to 32 bits, and data of pixels stored at each address within a block are changed from two laterally consecutive pixels as in the second exemplary embodiment to two laterally consecutive pixels and two longitudinally consecutive pixels.

Although each of the exemplary embodiments has been described by taking image data of 1024 pixels by 1024 lines as an example, the configuration of image data to which the present invention can be applied is not limited to such configuration. In the memories 12, 13 according to this exemplary embodiment, one block is assumed to have four longitudinally consecutive lines with respect to two laterally consecutive pixels on one line, and thus consists of image data of 8 pixels (2 pixels multiplied by 4 lines). Therefore, as long as data assignment on the basis of such a block is possible, possible configurations of the entire image data are not limited to image data of 1024 pixels by 1024 lines. For example, the image data may be formed with 2048 pixels×2048 lines or it may even be configured to have 4pixels×4 lines.

Furthermore, the bus width per memory for the memories 12, 13 according to the exemplary embodiments is either 8 bits or 16 bits, and one pixel within the image data stored in such memories is 8 bits long. It should, however, be appreciated by those skilled in the art that the bus width is not limited to the above and that the size of a pixel within the image data is not limited to 8 bits long.

Although the present invention has been described in the foregoing with reference to the exemplary embodiments, the invention is not limited to the configurations and operations of these exemplary embodiments. Those skilled in the art will appreciate that various modifications to the configurations and details of the invention are possible without departing from the scope and spirit of the invention.

The invention claimed is:

1. A memory access control device which includes a memory that stores data and controls access to said memory, comprising:
   a plurality of groups of said memory;
   a control unit that divides and stores said data in different memory areas of said plurality of groups of the memory distinguished based on one or more predetermined bits of an access address to said plurality of groups of the memory;
   wherein said data stored in said different memory areas of said plurality of groups of the memory are accessed simultaneously in the same clock cycle of access to said memory,
   wherein the one or more predetermined bits of said access address to said plurality of groups of the memory are controlled independently for each of said groups, and
   wherein the part of the access address to said plurality of groups of the memory other than said one or more predetermined bits controlled independently for each of said groups is common for said plurality of groups,
   wherein said data comprises two-dimensional unit data; and
   an access mode selection unit configured to select at least two modes from: a mode to access two horizontally consecutive unit data at a time, a mode to access two vertically consecutive unit data at a time, and a mode to access two unit data on vertically alternate lines at a time.

2. The memory access control device according to claim 1, wherein said data which comprises two-dimensional unit data are image data, and the unit data is pixel data.

3. The memory access control device according to claim 1, wherein each of said groups individually has the same memory capacity.

4. The memory access control device according to claim 1, wherein said data comprises one or more blocks, each of which is formed with a plurality of unit data, and
   wherein said one or more blocks within said data are identified by the part of the access address which is common for said plurality of groups within said access address, and each unit data which forms said one or more blocks is identified based on said one or more predetermined bits which are controlled independently for each of said groups, 5. The memory access control device according to claim 4, wherein if the amount of the unit data is smaller than a capacity per address in said memory, then a plurality of the horizontally consecutive unit data, a plurality of the vertically consecutive unit data or a plurality of the unit data in both horizontal and vertical directions are placed in one address, and the plurality of the unit data thus placed are treated as new unit data.

6. The memory access control device according to claim 4, wherein said data are divided into said plurality of groups according to a predetermined configuration.

7. The memory access control device according to claim 6, wherein said access address identifies the unit data stored after being divided into said plurality of groups according to said at least two modes.

8. The memory access control device according to claim 4, wherein said memory is formed with two groups: a first group and a second group; and
   wherein said data stored in said different memory areas of said two groups of the memory are accessed simultaneously in the same clock cycle of access to said memory.

9. The memory access control device according to claim 8, wherein said one or more blocks comprise a plurality of blocks formed in at least two arrangements among: an arrangement with two of the horizontally consecutive unit data, an arrangement with two of the vertically consecutive unit data and an arrangement with two of the unit data on vertically alternate lines; and
   wherein two of the unit data are individually stored in said different memory areas of said two groups of the memory.

10. The memory access control device according to claim 8, wherein said one or more blocks are formed within the ranges $0 \leq x \leq 1$ and $0 \leq y \leq 1$, where "x" and "y" are, within said access address to each of the unit data which forms said one or more blocks, the values which correspond to the x- and y-coordinates of each of the unit data within said one or more blocks, respectively;
   wherein the unit data at a coordinate $(0, 0)$ and the unit data at a coordinate $(1, 1)$ are stored in said first group; and
   wherein the unit data at a coordinate $(1, 0)$ and the unit data at a coordinate $(0, 1)$ are stored in said second group.

11. The memory access control device according to claim 10, wherein, within said access address to each of the unit data, a predetermined bit among said one or more predetermined bits which is controlled independently for each of said groups is a single bit for each of said groups, then within the ranges of $1 \leq \alpha \leq 1$ and $0 \leq \beta \leq 1$, where "$\alpha$" is the value of said single bit which corresponds to said first group and "$\beta$" is the value which corresponds to said second group;
   wherein the unit data at the coordinate $(0, 0)$ is stored at a $\alpha=0$ in said first group and the unit data at the coordinate $(1, 1)$ is stored at $\alpha=1$ in said first group; and
   wherein the unit data at the coordinate $(1, 0)$ is stored at $\beta=0$ in said second group and the unit data at the coordinate $(0, 1)$ is stored at $\beta=1$ in said second group.

12. The memory access control device according to claim 11, wherein in the case of the mode to access two of the horizontally consecutive unit data at a time, two of the unit data for which a $\alpha=\alpha$ holds true in said first and second groups are accessed at a time; and
   wherein, in the case of the mode to access two of the vertically consecutive unit data at a time, two of the unit data for which $\alpha=\beta+1$ holds true when the value of $\beta$ is 0, or tor which $\beta=\alpha+1$ holds true when the value of $\alpha$ is 0, are accessed at a time.

13. The memory access control device according to claim 8, wherein said one or more blocks are formed within the ranges of $0 \leq x \leq 3$ and $0 \leq y \leq 3$, where "x" and "y" are, within said access address to each of the unit data which forms said one or more blocks, values which correspond to x- and y-coordinates of each of the unit data within said one or more blocks, respectively;
   wherein the unit data at a coordinate $(0, 0)$, the unit data at a coordinate $(1, 1)$, the unit data at a coordinate $(1, 2)$ and the unit data at a coordinate $(0, 3)$ are stored in said first group; and wherein the unit data at a coordinate (1, 0), the unit data at a coordinate (0, 1), the unit data at a coordinate (0, 2) and the unit data at a coordinate (1, 3) are stored in said second group.

14. The memory access control device according to claim 13,
wherein, within said access address to each of the unit data, said one or more predetermined bits which are controlled independently for each of said groups are 2 bits, then within the ranges of $0 \leq \alpha \leq 3$ and $0 \leq \beta \leq 3$, where "$\alpha$" is the value of said one or more predetermined bits which corresponds to said first group and "$\beta$" is the value which corresponds to said second group;
wherein the unit data at the coordinate (0, 0) is stored at $\alpha=0$ in said first group, the unit data at the coordinate (1, 1) is stored at $\alpha=1$ in said first group, the unit data at the coordinate (1, 2) is stored at $\alpha=2$ in said first group and the unit data at the coordinate (0, 3) is stored $\alpha=3$ in said first group; and
wherein the unit data at the coordinate (1, 0) is stored at $\beta=0$ in said second group, the unit data at the coordinate (0, 1) is stored at $\beta=1$ in said second group, the unit data at the coordinate (0, 2) is stored at $\alpha=2$ in said second group and the unit data at the coordinate (1, 3) is stored at $\beta=3$ in said second group.

15. The memory access control device according to claim 14,
wherein, in the case of the mode to access two horizontally consecutive unit data at a time, two unit data for which $\alpha=\beta+1$ holds true in said first and second groups are accessed at a time,
wherein, in the case of the mode to access two vertically consecutive unit data at a time, two unit data for which $\alpha=\beta+1$ holds true when the value of $\beta$ is 0 or 2, or for which $\beta=\alpha+1$ holds true when the value of $\alpha$ is 0 or 2, are accessed at a time, and
wherein, in the case of the mode to access two unit data on vertically alternate lines at a time, two unit data for which $\alpha=\beta+2$ holds true when the value of $\beta$ is 0 or 1, or for which $\beta=\alpha+2$ holds true when the value of $\alpha$ is 0 or 1, are accessed at a time.

16. A memory access control method of controlling access to a memory that stores data, comprising:
a storage procedure of dividing and storing said data in different memory areas distinguished based on one or more predetermined bits of an access address to a plurality of groups of said memory; and
an access procedure of accessing said data stored in different memory areas of said plurality groups of the memory simultaneously in the same clock cycle of access to said memory;
wherein said memory is formed with two groups, a first group and a second group, and said data stored in said different memory areas of said two groups of the memory are accessed simultaneously in the same clock cycle of access to said memory, and
wherein the dividing and storing of said data in different memory areas comprises:
forming a plurality of blocks which form said data, each block comprising a plurality of unit data, said plurality of blocks formed in at least two arrangements among: an arrangement with two horizontally consecutive unit data, an arrangement with two vertically consecutive unit data, and an arrangement with two unit data on vertically alternate lines, and
individually storing two unit data in said different memory areas of said two groups of the memory, wherein said data comprises two-dimensional unit data, and
said method further comprising selecting at least two modes for accessing the two-dimensional unit data from: a mode to access two horizontally consecutive unit data at a time a mode to access two vertically consecutive unit data at a time, and a mode to access two unit data on vertically alternate lines at a time.

17. The memory access control method according to claim 16, wherein said accessing of data stored in different memory areas comprises identifying, based on said access address, the unit data stored after being divided into said plurality of groups according to a selected mode.

18. The memory access control method according to claim 16, wherein said storage procedure further comprises placing, if the amount of the unit data is smaller than a capacity per address in said memory, a plurality of said horizontally consecutive unit data, a plurality of said vertically consecutive unit data or a plurality of the unit data in both horizontal and vertical directions in one address, and treating the plurality of the unit data thus placed as new unit data.

19. The memory access control method according to claim 16, wherein said storage procedure comprises using image data formed with said two-dimensional unit data as said data, and storing pixel data as the unit data.

20. The memory access control method according to claim 16, wherein said accessing of said data stored in different memory areas comprises controlling the one or more predetermined bits of said access address to said plurality of groups of the memory independently for each of said groups.

21. The memory access control method according to claim 20, wherein said accessing of data stored in different memory areas further comprises identifying said plurality of blocks which form said data, based on a common part of the access address common to said plurality of groups, and identifying each of the unit data which form said plurality of blocks based on the one or more predetermined bits which are controlled independently tor each of said groups.

22. The memory access control method according to claim 20, wherein said forming said plurality of blocks comprises:
forming said plurality of blocks within the ranges of $0 \leq x \leq 3$ and $0 \leq y \leq 3$, where "x" and "y" are, within said access address to each unit data which forms said plurality of blocks, the values which correspond to x- and the y-coordinates of each unit data within said plurality of blocks, respectively,
storing the unit data at a coordinate (0, 0), the unit data at a coordinate (1, 1), the unit data at a coordinate (1, 2) and the unit data at a coordinate (0, 3) in said first group, and
storing the unit data at a coordinate (1, 0), the unit data at a coordinate (0, 1), the unit data at a coordinate (0, 2) and the unit data at a coordinate (1, 3) in said second group.

23. The memory access control method according to claim 22, wherein said accessing of said data stored in different memory areas further comprises:
providing that, within said access address to each unit data, said one or more predetermined bits which are controlled independently for each of said groups are 2 bits, and within the ranges of $0 \leq \alpha \leq 1$ and $0 \leq \beta \leq 3$, where "$\alpha$" is the value of a predetermined bit among said one or more predetermined bits which corresponds to said first group and "$\beta$" is the value which corresponds to said second group,
wherein said forming said plurality of blocks further comprises:
storing the unit data at the coordinate (0, 0) at $\alpha=0$ in said first group, the unit data at the coordinate (1, 1) at $\alpha=1$ in said first group, the unit data at the coordinate (1, 2) at β=2 in said first group and the unit data at the coordinate (0, 3) at α=3 in said first group, and storing the unit data at the coordinate (1, 0) at β=0 in said second group, the unit data at the coordinate (0, 1) at β=1 in said second group, the unit data at the coordinate (0, 2) at α=2 in said second group and the unit data at the coordinate (1, 3) at β=3 in said second group.

24. The memory access control method according to claim 23, wherein said accessing of said data stored in different memory areas further comprises:

in the case of a mode to access two horizontally consecutive unit data at a time, accessing each unit data for which α=8 holds true in said first and second groups at a time, in the case of a mode to access two vertically consecutive unit data at a time, accessing two unit data for which α=β+1 holds true when the value of β is 0 or 2, or for which β=α+1 holds true when the value of α is 0 or 2 at a time, and in the case of the mode to access two unit data on vertically alternate lines at a time, accessing two unit data for which α=β+2 holds true when the value of β is 0 or 1, or for which β=α+2 holds true when the value of α is 0 or 1, at a time.

25. The memory access control method according to claim 16, wherein said forming said plurality of blocks comprises forming said plurality of blocks within the range of 0≤x≤1 or 0≤y≤1, where "x" within said access address to each of the unit data that forms said plurality of blocks which form said data, the values which correspond to x- and y-coordinates of each of the unit data within said plurality of blocks, respectively;

the method further comprising:

storing the unit data at a coordinate (0, 0) and the unit data at a coordinate (1, 1) in said first group; and storing the unit data at a coordinate (1, 0) and the unit data at a coordinate (0, 1) in said second group.

26. The memory access control method according to claim 25, wherein said accessing of said data stored in different memory areas further comprises providing that, within said access address to each unit data, a predetermined bit among said one or more predetermined bits controlled independently for each of said groups is a single bit for each of said groups, and within the ranges of 0≤α≤1 and 0≤β≤1, where "α" is the value of said single bit which corresponds to said first group and "β" is the value which corresponds to said second group, wherein dividing and storing said data in different memory areas further comprises:

storing the unit data at the coordinate (0, 0) at α=0 in said first group and the unit data at the coordinate (1, 1) at α=1 in said first group, and storing the unit data at the coordinate (1, 0) at β=0 in said second group and the unit data at the coordinate (0, 1) at β=1 in said second group.

27. The memory access control method according to claim 26, wherein said accessing of said data stored in different memory areas further comprises:

in the case of a mode to access two horizontally consecutive unit data at a time, accessing each unit data for which α=β holds true in said first and the second groups at a time, and in the case of a mode to access two vertically consecutive unit data at a time, accessing two unit data for which α=β+1 holds true when the value of β is 0, or for which β=α+1 holds true when the value of α is 0, at a time.

28. A data storage method in a memory access control device which controls access to a memory that stores data, comprising:

a storage procedure of dividing and storing said data in different memory areas distinguished based on one or more predetermined bits of an access address to a plurality Of groups of said memory, wherein said memory is formed with two groups, a first group and a second group, and said data comprises two-dimensional unit data, said storage procedure further comprises:

forming a plurality of blocks which form said data, each block comprising a plurality of unit data, said plurality of blocks formed in at least two arrangements among: an arrangement with two horizontally consecutive unit data, an arrangement with two vertically consecutive unit data, and an arrangement with two of the unit data on vertically alternate lines, selecting, wherein said data comprises two-dimensional unit data, at least two modes for accessing the two dimensional unit data from: a mode to access two horizontally consecutive unit data at a time, a mode to access two vertically consecutive unit data at a time, and a mode to access two unit data on vertically alternate lines at a time, storing two of the unit data individually in said different memory areas of said two groups of the memory, wherein said forming said plurality of blocks comprises forming said plurality of blocks within the range of 0≤x≤1 or 0≤y≤1, where "x" and "y" are, within said access address to each of the unit data that forms said plurality of blocks which form said data, the values which correspond to x- and y-coordinates of each unit data within said one or more plurality of blocks, respectively, wherein said storage procedure further comprises:

storing the unit data at a coordinate (0, 0) and the unit data at a coordinate (1, 1) in said first group, and storing the unit data at a coordinate (l, 0) and the unit data at a coordinate (0, 1) in said second group.

29. The data storage method according to claim 28, wherein the one or more predetermined bits of said access address to said plurality of groups of the memory are controlled independently for each of said groups, wherein, within said access address to each unit data, a predetermined bit among said one or more predetermined bits which is controlled independently for each of said groups is a single bit for each of said groups, and 0≤α≤1 and 0≤β≤1 hold true, where "α" is the value of said single bit which corresponds to said first group and "β" is the value which corresponds to said second group, wherein said storage procedure further comprises:

storing the unit data at the coordinate (0, 0) at α=0 in said first group and the unit data at the coordinate (1, 1) at α=1 in said first group, and storing the unit data at the coordinate (1, 0) at β=0 in said second group and the unit data at the coordinate (0, 1) at β=1 in said second group.

30. The data storage method according to claim 28, wherein said storage procedure further comprises:

if the amount of the unit data is smaller than a capacity per address in said memory, placing a plurality of said horizontally consecutive unit data, a plurality of said vertically consecutive unit data or a plurality of the unit data in both horizontal and vertical directions in said one address, and treating the plurality of unit data thus placed as new unit data.

31. The data storage method according to claim 28, wherein said storage procedure further comprises:
using image data formed with two-dimensional unit data as said data, and storing pixel data as the unit data.

32. A data storage method in a memory access control device which controls access to a memory that stores data, comprising:
a storage procedure of dividing and storing said data in different memory areas distinguished based on one or more predetermined bits of an access address to a plurality of groups of said memory,
wherein said memory is formed with two groups, a first group and a second group, and said data comprises two-dimensional unit data,
said storage procedure further comprises:
forming a plurality of blocks which form said data and each of which comprises a plurality of unit data, said plurality of blocks formed in at least two arrangements among: an arrangement with two of horizontally consecutive unit data, an arrangement with two of vertically consecutive unit data, and an arrangement with two unit data on vertically alternate lines,
selecting, wherein said data comprises two-dimensional unit data at least two modes for accessing the two-dimensional unit data from: a mode to access two horizontally consecutive unit data at a time, a mode to access two vertically consecutive unit data at a time, and a mode to access two unit data on vertically alternate lines at a time,
storing two unit data individually in said different memory areas of said two groups of the memory,
wherein said forming said plurality of blocks comprises forming said plurality of blocks within the ranges of $0 \leq x \leq 3$ and $0 \leq y \leq 3$, where "x" and "y" are, within said access address to each unit data which forms said plurality of blocks, the values which correspond to x- and the y-coordinates of each unit data within said plurality of blocks, respectively,
wherein said storage procedure further comprises:
storing the unit data at the coordinate (0, 0), the unit data at the coordinate (1, 1), the unit data at the coordinate (1, 2) and the unit data at the coordinate (0, 3) in said first group, and
storing the unit data at a coordinate (1, 0), the unit data at a coordinate (0, 1), the unit data at a coordinate (0, 2) and the unit data at a coordinate (1, 3) in said second group.

33. The data storage method according to claim 32,
wherein the one or more predetermined bits of said access address to saidplurality of groups of the memory are controlled independently for each of said groups,
wherein, within said access address to each unit data, said one or more predetermined bits which are controlled independently for each of said groups are 2 bits and $0 \leq \alpha \leq 3$ and $0 \leq \beta \leq 3$ hold true, where "α" is the value of a predetermined bit among said one or more predetermined bits which corresponds to said first group and "β" is the value which corresponds to said second group,
said storage procedure further comprises:
storing the unit data at the coordinate (0, 0) at α=0 in said first group, the unit data at the coordinate (1, 1) at α=1 in said first group, the unit data at the coordinate (1, 2) at α=2 in said first group and the unit data at the coordinate (0, 3) at β=3 in said first group, and
storing the unit data at the coordinate (1, 0) at β=0 in said second group, the unit data at the coordinate (0, 1) at β=1 in said second group, the unit data at the coordinate (0, 2) at β=2 in said second group and the unit data at the coordinate (1, 3) at β=3 in said second group.

34. A non-transitory computer-readable recording medium for storing a memory access control program to be executed on a computer device to control access to a memory that stores data, said memory access control program causing said computer device to execute:
a storage function which divides and stores said data in said different memory areas distinguished by one or more predetermined bits of an access address to a plurality of groups of said memory, and
an access function which accesses said data stored in different memory areas of said plurality groups of the memory simultaneously in the same clock cycle of access to said memory,
wherein said memory is formed with two groups, a first group and a second group,
wherein the accessing of said data stored in said different memory areas comprises accessing said data stored in said different memory areas of said two groups of the memory simultaneously in the same clock cycle of access to said memory,
wherein the dividing and storing of said data in different memory areas comprises:
forming a plurality of blocks which form said data, each block comprising a plurality of unit data, said plurality of blocks formed in at least two arrangements among: an arrangement with two horizontally consecutive unit data, an arrangement with two vertically consecutive unit data, and an arrangement with two unit data on vertically alternate lines, and
storing two of the unit data individually in said different memory areas of said two groups of the memory,
wherein said data comprises two-dimensional unit data; and
said memory access control program causes said computer device to further execute:
selecting at least two odes from: a mode to access two horizontally consecutive unit data at a time, a mode to access two vertically consecutive unit data at a time, and a mode to access two unit data on vertically alternate lines at a time.

35. The non-transitory computer-readable recording medium which stores a memory access control program to be executed on a computer device according to claim 34, wherein said access function identifies, based on said access address, the unit data stored after being divided into said plurality of groups according to said mode.

36. The non-transitory computer-readable recording medium which stores a memory access control program to be executed on a computer device according to claim 34, wherein said storage function:
forms said plurality of blocks within the ranges of $0 \leq x \leq 3$ and $0 \leq y \leq 3$, where "x" and "y" are, within said access address to each unit data which forms said plurality of blocks, the value which corresponds to x- and the y-coordinates of each unit data within said plurality of blocks, respectively, stores the unit data at a coordinate (0, 0), the unit data at a coordinate (1, 1), the unit data at a coordinate (1, 2) and the unit data at a coordinate (0, 3) in said first group, and stores the unit data at a coordinate (1, 0), the unit data at a coordinate (0, 1), the unit data at a coordinate (0, 2) and the unit data at a coordinate (1, 3) in the second group.

37. The non-transitory computer-readable recording medium which stores a memory access control program to he executed on a computer device according to claim 34, wherein said storage function:

if the amount of the unit data is smaller than a capacity per address in said memory, places a plurality of the horizontally consecutive unit data, a plurality of the vertically consecutive unit data or a plurality of the unit data in both horizontal and vertical directions in said one address, and treats the plurality of the unit data thus placed as new unit data.

38. The non-transitory computer-readable recording medium which stores a memory access control program to be executed on a computer device according to claim 34, wherein said storage function:

uses image data formed with said two-dimensional unit data as said data, and stores pixel data as the unit data.

39. The non-transitory computer-readable recording medium which stores a memory access control program to be executed on a computer device according to claim 34, wherein said access function controls the one or more predetermined bits of the access address to said plurality of groups of the memory independently for each of the groups.

40. The non-transitory computer-readable recording medium which stores a memory access control program to be executed on a computer device according to claim 39, wherein said access function identifies said plurality of blocks which form said data, based on a common part of the access address common to said plurality of groups within said access address, and identifies each of the unit data which form said plurality of blocks based on said one or more predetermined bits which are controlled independently for each of said groups.

41. The non-transitory computer-readable recording medium which stores a memory access control program to be executed on a computer device according to claim 34, wherein said storage function:

forms said plurality of blocks within the range of $0 \le x \le 1$ or $0 \le y \le 1$, where "x" and "y" are, within said access address to each of the unit data that forms said plurality of blocks which form said data, the values which correspond to x- and y-coordinates of each of the unit data within said plurality of blocks, respectively, stores the unit data at a coordinate (0, 0) and the unit data at a coordinate (1, 1) in said first group, and stores the unit data at a coordinate (1, 0) and the unit data at a coordinate (0, 1) in said second group.

42. The non-transitory computer-readable recording medium which stores a memory access control program to be executed on a computer device according to claim 41, wherein the one or more predetermined bits of access address to said plurality of groups of the memory are controlled independently for each of said groups, wherein said access function:

provides that, within said access address to each of the unit data, a predetermined bit among said one or more predetermined bits which is controlled independently for each of said groups is a single bit for each of said groups, and within the ranges of $0 \le \alpha \le 1$ and $0 \le \beta \le 1$, where "$\alpha$" is the value of said single bit which corresponds to said first group and "$\beta$" is the value which corresponds to said second group, said storage function:

stores the unit data at the coordinate (0, 0) at $\alpha=0$ in said first group and the unit data at the coordinate (1, 1) at $\alpha=1$ in said first group, and stores the unit data at the coordinate (1, 0) at $\beta=0$ in said second group and the unit data at the coordinate (0, 1) at $\beta=1$ in said second group, 43. The non-transitory computer-readable recording medium which stores a memory access control program to be executed on a computer device according to claim 42, wherein said access function:

in the case of the mode to access two of the horizontally consecutive unit data at a time, accesses each of the unit data for which $\alpha=1$ holds true in said first and second groups at a time, and in the case of the mode to access two of the vertically consecutive unit data at a time, accesses two of the unit data for which $\alpha=\beta+1$ holds true when the value of $\beta$ is 0 or for which $\beta=\alpha 1$ holds true when the value of $\alpha$ is 0 at a time.

44. The non-transitory computer-readable recording medium which stores a memory access control program to be executed on a computer device according to claim 34, wherein the one or more predetermined bits of said access address to said plurality of groups of the memory are controlled independently for each of said groups, wherein said access function:

provides that, within said access address to each unit data, said one or more predetermined bits which are controlled independently for each of said groups to be 2 bits, and within the ranges of $0 \le \alpha \le 3$ and $0 \le \beta \le 3$, where "$\alpha$" is the value of a predetermined hit among said one or more predetermined bits which corresponds to said first group and "$\beta$" is the value which corresponds to said second group, said storage function:

stores the unit data at a coordinate (0, 0) at $\alpha=0$ in said first group, the unit data at a coordinate (1, 1) at $\alpha=1$ in said first group, the unit data at a coordinate (1, 2) at $\alpha=2$ in said first group and the unit data at a coordinate (0, 3) at $\alpha=0$ in said first group, and stores the unit data at a coordinate (1, 0) at $\beta=0$ in said second group, the unit data at a coordinate (0, 1) at $\beta=1$ in said second group, the unit data at a coordinate (0, 2) at $\beta=2$ in said second group and the unit data at a coordinate (1, 3) at $\beta=3$ in said second group.

45. The non-transitory computer-readable recording medium which stores a memory access control program to be executed on a computer device according to claim 44, wherein said access function:

in the case of the mode to access two the horizontally consecutive unit data at a time, accesses each of the unit data for which $\alpha=\beta$ holds true in said first and second groups at a time, and in the case of the mode to access two said vertically consecutive unit data at a time, accesses two of the unit data for which $\alpha=\beta+1$ holds true when the value of $\beta$ is 0 or 2, or for which $\beta=\alpha+1$ holds true when the value of $\alpha$ is 0 or 2 at a time, and in the case of the mode to access two of the unit data on vertically alternate lines at a time, two of the unit data for which $\alpha=\beta+2$ holds true when the value of $\beta$ is 0 or 1, or for which $\beta=\alpha+2$ holds true when the value of $\alpha$ is 0 or 1, are accessed at a time.

* * * * *